United States Patent [19]
Jones

[11] Patent Number: 5,289,540
[45] Date of Patent: * Feb. 22, 1994

[54] COMPUTER FILE PROTECTION SYSTEM

[75] Inventor: Richard P. Jones, 7930 East Side Dr. NE., Tacoma, Wash. 98422

[73] Assignee: Richard P. Jones, Tacoma, Wash.

[ * ] Notice: The portion of the term of this patent subsequent to Sep. 1, 2009 has been disclaimed.

[21] Appl. No.: 935,181

[22] Filed: Aug. 26, 1992

Related U.S. Application Data

[63] Continuation of Ser. No. 340,886, Apr. 19, 1989, Pat. No. 5,144,659.

[51] Int. Cl.$^5$ .............................................. G06F 12/14
[52] U.S. Cl. ........................................ 380/4; 380/23; 380/25; 380/49; 380/50; 340/825.31; 340/825.34; 380/3; 380/4; 380/23; 380/25; 380/49; 380/50
[58] Field of Search ............................ 395/425, 725; 340/825.31, 825.34

[56] References Cited

U.S. PATENT DOCUMENTS

| | | | |
|---|---|---|---|
| 3,893,084 | 7/1975 | Kotok et al. | 395/425 |
| 4,588,991 | 5/1986 | Atalla | 340/825.31 |
| 4,634,807 | 1/1987 | Chorley et al. | 380/4 |
| 4,652,990 | 3/1987 | Pailen et al. | 380/4 |
| 4,713,753 | 12/1987 | Boebert et al. | 395/425 |
| 4,797,928 | 1/1989 | Dykes | 380/49 |
| 5,144,659 | 9/1992 | Jones | 380/4 |

*Primary Examiner*—Bernarr E. Gregory
*Attorney, Agent, or Firm*—Griffin, Butler, Whisenhunt & Kurtossy

[57] ABSTRACT

The invention is a system for protecting the security of computer files. It has hardware elements, including a programmable auxiliary memory and control unit along with associated software elements. The security subsystem is installed on the host computer bus so that it resides in the control logic, address, and data signal path between the computer storage device and central processing unit. The security system is accessible by the computer operating system only during installation and initialization. Thereafter it is inaccessible to or by the operating system. Supervisor determined criteria for access permission to read, write and execute files are entered into the auxiliary memory system where they are protected from alteration. The security system will deny access to users with invalid entry criteria and refuse to write data to the file storage device when unauthorized operations have been attempted. When breaches of these types occur the security system can lock the computer against further activity until it is released by entry of a master password from supervisory or security personnel. The system maintains a protected area in the computer memory device where, among other data, file signatures of all valid files are retained. The protected area of memory also maintains appropriate signatures of all internal files in the security system so that they can be automatically checked for integrity.

10 Claims, 28 Drawing Sheets

COMPUTER FILE PROTECTION SYSTEM

This is a continuation application of Ser. No. 07/340,886, filed Apr. 19, 1989, now U.S. Pat. No. 5,144,659.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyrights whatsoever.

BACKGROUND OF THE INVENTION

The present invention is a method for protection of computer files from unauthorized access and/or modification and from unintentional damage. It is particularly useful for protection of files against malevolent tampering and sabotage.

A problem of serious and potentially disastrous proportions exists in the protection of computer files from unauthorized modification. This ranges from unauthorized but benign entry by unethical computer buffs, who regard it as a personal challenge to find ways to enter a system, to deliberate and criminal sabotage of stored data and software. The extent of computer crime has grown markedly as criminal elements, now aware of the possibility for ill gotten gain or vengeance, have achieved a hitherto unknown level of sophistication. Much of the computer crime that does occur is little publicized. This is to minimize its consequences and to avoid encouragement of others who might find it attractive. In addition to the possible enormous consequences for business, education, and general government operations, the implications for defense could be of the nature of a major national disaster.

An especially pernicious form of file modification is known as a "virus". The analog to a biological virus is readily apparent. A computer virus is designed to attach itself to a program already on the computer. The result is a program that is "infected". This usually occurs in a manner that, at least initially, is unapparent to the legitimate user. The infected target files are usually unchanged until some predefined event or events take place. At this time the virus embedded in the infected files activates. The action taken when the virus is triggered may range from a harmless message flashed throughout the system to the complete destruction of all files in the infected system. A virus must, by definition, modify a file stored in the system in order to propagate itself. A virus recently propagated within three days throughout a nationwide computer network and caused damage in excess of $10 million.

Other forms of computer file vandalism are known within the computer profession as "worms", "Trojan horses", and "bombs". All such programs modify the file system in some manner in order to perform their intended function. While the above terms have specific meaning to computer scientists, for the sake of convenience they will all be classified here as "viruses" since their operation, intent and methods of prevention are in most ways very similar.

Computer files are also subject to innocent errors resulting from accidental and unintended mistakes. Within a given environment the effect may be as damaging as a virus. However, such errors generally do not spread to other computers. A particularly vulnerable environment is one in which software development is in progress. Generally there is no mechanism for protecting files on a computer system from damage by errant programs. Valuable files can easily be destroyed requiring many hours, days or weeks for reconstruction.

Another source of innocent error is accidental erasure or modification of files. This can result from a simple mistake on the part of the operator and may or may not be salvageable. Most of the commonly used operating systems for individual or networked computers allow files to be erased or modified with simple commands that do not prompt or question the user before proceeding.

Computer security has itself become a recognized specialty within the profession. The most common method of minimizing problems from intrusive sabotage is to incorporate software in the computer system that checks for known types of viruses and/or periodically checks the integrity of the files in the system. There are a number of variations on the software approach to protection. One method of checking file integrity is to perform a test of each file which results in a unique "signature" for the file. This method is reasonably robust but it is somewhat time consuming. Most often, the signature is generated using a Cyclic Redundancy Code (CRC) algorithm. This test does nothing to cure a file which might have become infected but it does identify files which have been infected since they were last tested. To be truly effective the test should be run each time a file is accessed. However, in most cases this would impose such a large overhead as to make the system non-productive.

A second method is to incorporate a software program which checks each file as it is used for a set of known types of infection. Several problems exist with this approach. First, a number of viruses are self-modifying. By that is meant that they change their characteristics specifically in order to thwart this kind of protection. Second, new viruses unknown to the protection program may be introduced into the file system and these will not be recognized. A third problem is that of overhead. It may be so great as to significantly reduce the usefulness of the system.

Another method provides a hardware module which can be programmed to write protect the entire file system. This method is clearly foolproof but poses such cumbersome limitations that it has only limited usefulness. Most business or scientific applications and virtually all program development environments require the ability to modify files. As one example, the files in a database application are usually continually updated by new additions and deletions. The hardware write protect approach appears to have merit only in those unusual instances where an application does not require the file system to be modified. If software support is used to determine when a file can be modified, it is susceptible to the same problems and disadvantages of the other software approaches.

A fourth method uses passwords and other user specific security protection to limit access to the file system. This is desirable and should be common practice in most computer networks. But it does not prevent the problem of virus entry. One of the most destructive viruses reported to date infected over 5000 computers, all of which had a password and user permission-based file system. The most common use of this type of protection is found on computers based on the UNIX operating system. Unix is a trademark of AT&T Information Systems, New York, New York, for a linked multi-workstation computer system. In regard to accidental file erasure, a number of products are available with an "unerase" feature. These take advantage of the way most files are removed from a directory by the operating system. The operating system simply indicates that the storage space of the deleted file is now available for new files, without actually physically erasing the earlier material. The unerase software restores the deleted file name back into the directory. However, it can function successfully only if the storage space occupied by the deleted file has not been overwritten. The process of attempting to recover an accidentally erased file is time consuming and can sometimes result in a corrupted file even under the best of circumstances.

Finally, any software based system of virsus protection has an inherent flaw that can itself be fatal. The very software that is intended to protect against infection can itself be the source of a virus. This very problem recently occurred with a suite of commercial programs, touted as the ultimate in anti-virus protection. The case in point was apparent sabotage by a disgruntled employee of the software firm marketing the protection system. An untold number of infections occurred and the manufacturer now faces an enormous liability for damage caused by his product.

Any security system, intended to provide protection for file systems, which is accessible to the general user through standard system resources can potentially be breached. Whether software based on hardware based, if the protection system can be accessed via normal system resources, then it can be bypassed or, even worse, used to camouflage a virus. A user who thinks the file system is protected is often complacent and less alert to the possibility of an infection. This often leads to a virus doing extensive damage before it is even noticed.

Cognizant of the above noted shortcomings in existing file security systems, the present invention represents a major improvement that greatly reduces and tightly controls the number of potential access points for virus entry without compromising convenience and utility for the general user.

SUMMARY OF THE INVENTION

The present computer file security system has both hardware and software elements. Unlike any other system known to the present inventor, once installed, the protective elements of the system are completely inaccessible to the general user. The system provides essentially absolute protection against inappropriate modification of all designated files held within the computer memory device.

The file system protection process operates by intercepting the file system data path between the central processing unit and the file storage or memory device. The requested operation is processed according to the criteria established by the supervisory and/or security personnel of the computer system. An elaborate and virtually unbreakeable system of access eliminates any chance of file corruption by a general user.

The security subsystem is accessible by the computer operating system for initialization and modification only during an installation stage. After that time the security subsystem is inaccessible to or by the operating system.

Each time the security subsystem sends an error message to a user it is checked for file integrity. At this time it takes possession of and disables all other access to the computer central processing unit.

In general, the hardware elements of the system are integrated with a controller for mass storage of the file system, although this is not always necessary. The process can be just as easily incorporated into a local network (LAN) controller, a communications controller, or a main processor board for a system. In its broadest form, the present file security system could be applied to a wide variety of situations where access to critical data must be controlled.

The invention includes a programmable auxiliary memory and auxiliary control unit. These can be attached to the host computer bus in a manner so that they are in the control logic, address, and data signal path between the central processing unit and the file storage system. However, once installed in the computer system, the file security system is inaccessible to or by the host computer operating system. Access to the file security system is possible only by using a unique password held by the appropriate supervisory and/or security personnel. Access may be established on a hierarchical basis so that for some designated operations more than one individual must enter passwords in proper sequence.

The supervisory personnel will choose and enter the appropriate criteria for access permission to read, write, and execute operations for all files to be protected. These criteria will be specific to each user or user group. The file security system can be programmed for graduated levels of security and lockout for various types of users.

Upon receiving valid user identification, the auxiliary memory and control unit will indicate to the host computer operating system which files are accessible to that user and the nature of the operations that can be performed on the files. Similarly, users with invalid entry criteria for the files requested will be denied entry and the file security system will refuse to allow data to be written into the host computer file system when unauthorized operations have been attempted.

In many linked computer systems each computer central processing unit has its own associated file system. Usually, the file systems of every individual computer in a linked system are electronically available to every other computer in the system. Most preferably, the file security system of the present invention should be used to protect each file system in a given linked computer system. This would require associating a security system with each file storage device in the system. However, it is quite possible to protect some of the computers in the system while leaving others unprotected. Some linked systems are constructed with a central file storage device, or file server, which is tied to a number of different computers, each having its own central processing unit. In this case a single file security system is adequate to protect the entire network. The file security system of the present invention is equally suitable for use on a single terminal computer.

DETAILED DESCRIPTION OF THE PREFERRED EMBODIMENTS

Figure 1:
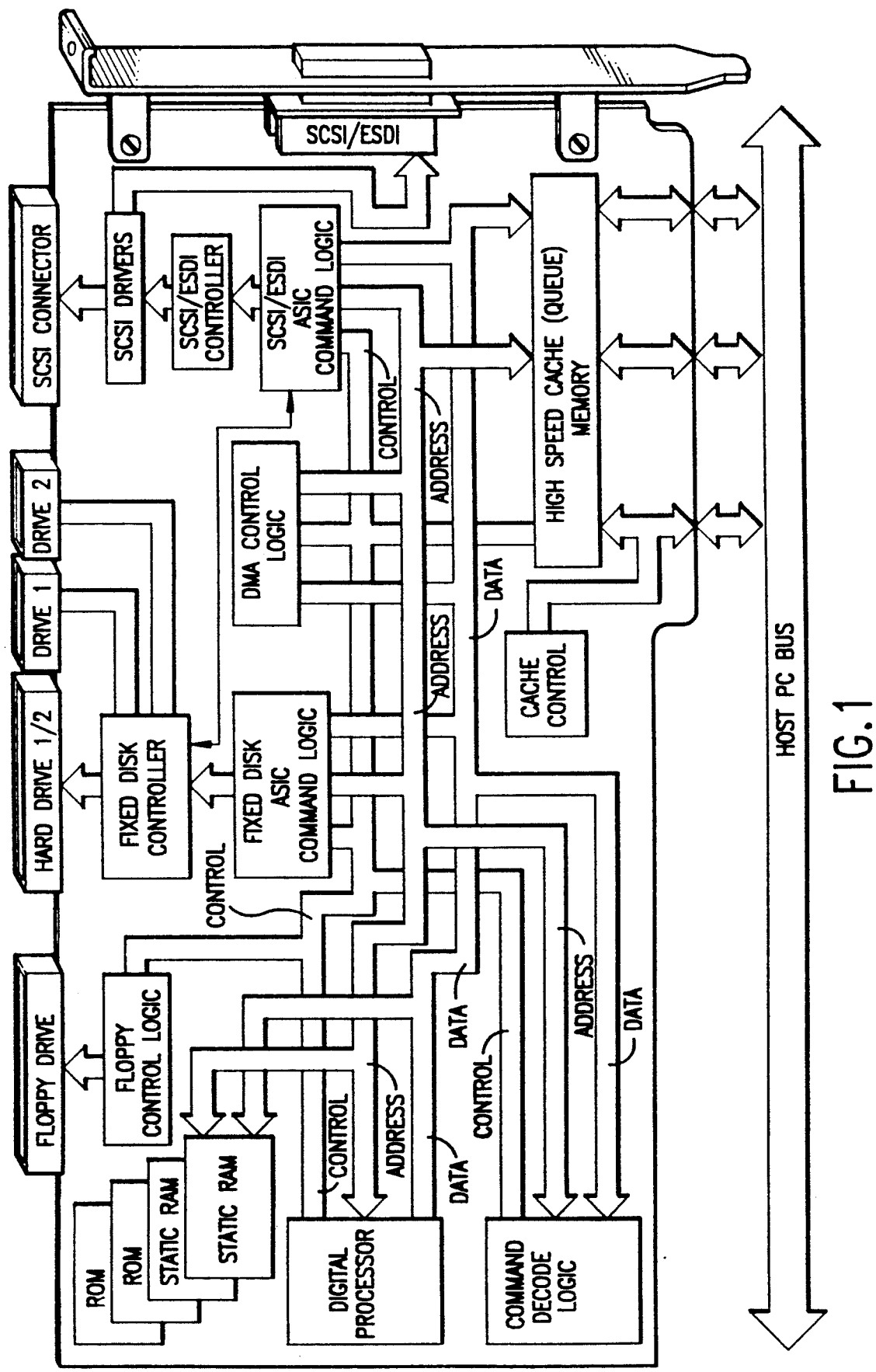
FIG. 1 is a simplified block diagram of a hardware card showing one implementation of the present invention.

Most of the terms and abbreviations used herein are in common use and well understood by those skilled in computer science. However, the following definitions will unequivocally set their context for the present invention.

ADR, ADDR address
ATRIB attribute
AUTH authorized
BIOS basic input/output system
BLD build
BPB Bios parameter block
BUS bus (command, address, or data)
BZY busy
CHG change
CHK check
CMD command
CNT count
CNTRL control
CNTX number of increments successfully transferred
CPU central processing unit
CRC cyclic redundancy check
CRTL control
DAT data
DEV device
DMA direct memory access
DPAC data packet
DSTR 32 bit starting logical sector
ERR error
ERRS errors
FLG flag
FRE free
FSS file security system
GEN generic
GET get
HD head
HDR header
IBM-PC a personal computer manufactured by International Business Machines Corporation.
ID identity or identification
ILL illegal
INIT initialize
IOCTL input/output control
LBL label
LOG logical
MAJ major
MEM memory
MS-DOS Microsoft Disk Operating System
MTY empty
NUM number
PAC packet
PARM parameter
PC-DOS IBM Personal Computer Disk Operating System
PHYS physical
PREV previous
PTR pointer
QUE queue
RD read
RH request header (from MS-DOS)
RMV remove, removable
SECT sector
SEEK seek
SET set
STAT status
STR starting
SYS system
TBL table
TRK track
TYP type
TSR terminate and stay resident
USR user
VFY verify
VOL volume
WR write
XADR transfer address
XCNT number of increments requested to be transferred
XFR transfer
XSS starting section for transfer The term "bus" or "host computer bus" refers to the electronic paths within the host computer that carry address, control, and data signals. The "address bus" is a collection of electronically continuous lines used to provide a unique location for access to a system resource such as memory or input/output devices. The "data bus" is a similar collection of lines used to pass information between locations determined by the address bus. The "control bus" is a similar collection of electronically continuous lines used to define the kind of operation to be performed on a system resource. As an example, the "memory read line" (MEMR) of the IBM-PC control bus specifies that the operation to be performed is to read the contents of memory at the location specified by the address bus and place that information on the data bus. While a bus is most usually regarded in terms of electrical conductors, it should be considered more broadly in terms of the present invention. As used herein the term "bus" should be considered to also include any alternate means of data interface with the CPU of the computer system that would serve the same purpose as conventional electrical conductors. A fiber optic system could be one such alternative. In its broadest context a "bus" is any means or method that carries information between the computer system and any peripheral devices and which provides control and data to a file storage device. It does not matter whether the device is internal or external to the computer itself.

A "device" is any physical piece of equipment integral with the computer system, such as a mass storage unit, printer, console, etc. In terms of internal communication within the computer a "device" is treated or considered in the same manner as a file would be. A "logical device" is a method of mapping a physical device to hide its real characteristics from the operating system. Although multiple physical devices could be mapped to a single logical device, a more common approach is to map a single physical device to multiple logical devices; e.g., a single 64 megabyte hard disk can be mapped to two 32 megabyte logical devices.

"Direct memory access" (DMA) is used to move data between memory and a device by taking control of the address bus, data bus and control bus. The CPU is disabled during the DMA cycle.

A "logical sector address" enables the use of logical addressing by operating systems to access mass storage devices and hides the physical characteristics of the device. Logical addressing provides significant improvements in device independence of the operating system. The conversion of logical address to physical address is device dependent.

"Parameters" when used with a process are data passed to the process. When referring to a device they are the constants that define the device; e.g., the number of heads, sectors per track, etc.

A "pointer" is an "object" or variable used to hold the address of another object; i.e., it "points" to the other object. The context of the term "object" is a variable used to hold an address within the addressable range of values of the main CPU. The pointer is used to indirectly store or retrieve other variables.

"Programmed I/O" describes input or output operations which are controlled by the CPU. This type of I/O is generally used to write to the device control register and read from the device status register. Data transfers are usually handled by direct memory access.

A "queue" is a form of temporary storage used to allow asynchronous data flow between the source and destination. A common form of queue is to allow data to continue to be placed in a waiting list, to avoid having the data source wait, while a slower process operates on the list. The queue is monitored to prevent overflow. If the queue fills the process sourcing the data must wait until the data consumer has removed data.

A "register" is a location used to hold information associated with an operation. "Device registers" hold either control information, status of device after operation, or data. A "control register" is a device register used to select the function to be performed by the device. A "data register" is used to hold data for transfer to and from the data bus under program control.

A "terminate and stay resident" (TSR) program is one that remains in memory after initial activation. The file security system uses such a program to communicate with the user; e.g., "Access Not Authorized" or "Invalid Password".

Before describing the present invention in detail, it could be helpful to the general reader to very briefly review the essential elements of a digital computer most closely related to operation of the invention. All computers have a central processing unit (CPU) and a file storage device. The latter may include a fixed or "hard" disk, one or more flexible or "floppy" disks, a magnetic tape unit, or an optical device such as a laser read compact disk unit. The CPU and storage device are joined electronically by a bus system that carries address, control and data signals. The electrical path may not always be electrically direct; i.e. there may be intervening operations on the signals, but the bus maintains the main route of electronic communication between the two units. Other devices such as disk controllers, etc. are essential to operation but are peripheral to the present explanation.

In addition to the basic electronic "hardware", the computer must have a software package known as an "operating system". This serves to enable and supervise the flow of signals between the various hardware elements of the computer, such as the CPU and file storage device, and between the computer and operator. The operating system is not an operations software program, such as a data management or spread-sheet tool would be, but it is essential to their use.

A number of well known operating systems are available for computers of different types and capabilities. Two of the most popular products are very similar and are intended for use with personal computers. These are known as MS-DOS and PC-DOS (Microsoft Operating System and Personal Computer Operating System). MS-DOS is a registered trademark of Microsoft Corporation, Redmond, Wash. and PC-DOS and IBM are registered trademarks of International Business Machines Corporation, Armonk, N.Y. The present invention is suitable for use with these as well as other operating systems such as CP/M, VMS, or UNIX. CP/M is a registered trademark of Digital Research, Pacific Grove, Calif. VMS is a registered trademark of Digital Equipment Corporation, Maynard, Mass. UNIX is a trademark of AT&T Information Systems, New York, N.Y. This list should be considered as exemplary and is not inclusive of the many other operating systems suitable for use in conjunction with the present invention.

Whatever the operating system, there is a minimum set of file system operations that must be available. This set must include:

(1) A means of listing the files available on the system to a terminal or display;

(2) A method of providing unique names and internal addresses for the files;

(3) The ability to create a new file, to write information to a file, to read information from a file, and to change the size of a file by adding or deleting information; and (4) The ability to remove a file from the system.

To implement this minimum set of file system operations there is an attendant set of hardware and software functions. While these functions vary in complexity and capability the following is a representative minimum set.

(1) A means of storing files. Usually this is a mass storage device such as a fixed disk or one of the other types previously noted. The file system must be capable of handling files in a manner consistent with the requirements of the operating system.

(2) A method of formatting the storage medium to meet the needs of the file system. The format generally involves sectioning the storage medium in such a way that the translation between a logical location and a physical location is minimized. The operating system deals with logical addresses of information while the actual storage device operates on physical addresses.

(3) A means of passing commands to the storage subsystem. This typically is a hardware card that interfaces the addresses and data from the system bus to the storage subsystem hardware.

(4) A means of implementing commands to (a.) position or index the storage media to a known starting position, (b.) read from a specific location on the medium and make the information available to the system bus, and (c.) write information from the system bus to a specific location on the medium. In the latter two cases the information is moved directly into and from the system read/write memory by a mechanism known as direct memory access (DMA).

The file security subsystem may be likened to a gate and gate tender on the pathway linking the CPU and file storage subsystem. Only information that meets a set of predefined criteria is allowed to pass. Once placed in position, the gate is impregnable to any changes in the criteria that an unauthorized person might attempt to be made via the operating system. Changes can only be made by an appropriate security director having the master access password.

This location in a computer is unique for a file security system. The only other subsystem placed astride the main bus in similar fashion is an encryption/unencryption device. It is emphasized here that the file security subsystem in not, nor is it in any way analogous, to an encryption device. It may include an encryption device but this would be entirely ancillary to its main function and operation.

Because they are so well known and in such common use, the description of the invention that is to follow will be based on the use of the PC-DOS or MS-DOS operating systems used with IBM or IBM-type personal computer equipment. However, it should be understood that this is done for the sake of convenience and simplicity of description and the invention should not be considered as limited to these or any other operating systems or computer equipment.

The file security subsystem has a cache memory system attached to the host computer main bus. This provides the elasticity needed to minimize delays associated with the parsing of information by the protection process. While a specific bus transaction is being evaluated, additional transactions are queued up for subsequent processing.

During installation of the file security subsystem (FSS), a set of file access criteria are entered and stored in nonvolatile memory in the FSS and also written to a portion of the host computer file storage device which is subsequently marked as inaccessible to the operating system. These criteria are used by the protection process to determine the type of access authorized on a specific system. After installation the file security system is accessible only by use of a master password that will presumably be known only by an appropriate security director or system administrator.

The file access criteria will include the names of files which are to be protected at all times. These will generally be the basic executable files that constitute the application for which the system is intended, as well as any utility and system files used by or in support of the application. The access criteria will also contain the names of files that are allowed to modify specified files along with the type name of the specific files which may be modified.

Other access criteria are relatively conventional. The user may be required to enter a login code which can be associated with a specific directory, group of files, or both. The login code can then be used as a test for a password; i.e., if the password given is not authorized for the login group entered, the user will be denied access, even if the password is otherwise valid. This, in effect, provides a double password system.

Operation of the File Security System

During startup, the file security system will check the files associated with the operating system for consistency. This is done by comparing the file signatures of the active files with those held in an archival status in a portion of memory within the file storage device that is inaccessible to the operating system. The same check can be made for any change in file signature of all executable files. As was noted earlier, a unique signature for each file can be generated; e.g., by using a cyclic redundancy code algorithm. If any inconsistency is found during startup, the file system storage device is write protected by the file security system and the user notified. The file which caused the warning is identified and the system is effectively locked until corrective action is taken. This might include removal and replacement of the affected file or an override by the system administrator who must use the master password. If the decision is made to override, the file signature can be updated so that the next startup will accept the modified file.

Programs run by the user are consistency checked as they are loaded into the system memory for execution. As in the startup phase above, any corruption of a file will result in disabling the write circuitry, user notification, and system lockup pending supervisory action.

The file security system will detect any attempt to install new files on the system via the disc drives, serial interface, supported local area networks, or by any executable file. This applies even if the new file is generated on the workstation itself.

The system administrator has a great deal of flexibility in setting security levels. Certain features can be disabled or expanded at the discretion of the administrator.

An optional feature of the file protection system is creation of a transaction log recorded in the protected portion of the file storage device. This can include such items as attempted entries to the system, entries attempted using bad login codes or passwords, terminal locations, time and date, etc. The transaction log is accessible only to supervisory people possessing the master password to the file security system.

It can be seen from the above description that by placing the file security system in the data path between the CPU and storage device, and by making it invisible to the operating system, the computer file system is protected against deliberate tampering from either local sources or those at other linked locations. Corrupted files are refused entry by write protecting the storage device. Even in the event that such files should somehow find entry, they are detected and identified and the system is locked before the corrupted files can do the intended damage. This protection is equally important in guarding the system from damage by benign errors that frequently occur during program development.

A very important part of the file security system is its terminate and stay resident (TSR) program. In the event of entry being denied to the system for some reason, or an unauthorized operation being attempted, the TSR program will send an error message to the user. However, before each use the TSR program is itself checked for file integrity. During the time the TSR program is active it takes possession of and disables all other access to the CPU. Further the TSR program directly accesses the keyboard, bypassing all system software.

Specific operation of the file security system hardware and software can best be understood by now referring to the Figures. FIG. 1 is a simplified block diagram showing one version of a hardware implementation. Given this diagram, the specific construction of the unit will be evident to one skilled in computer science.

Figure 2:
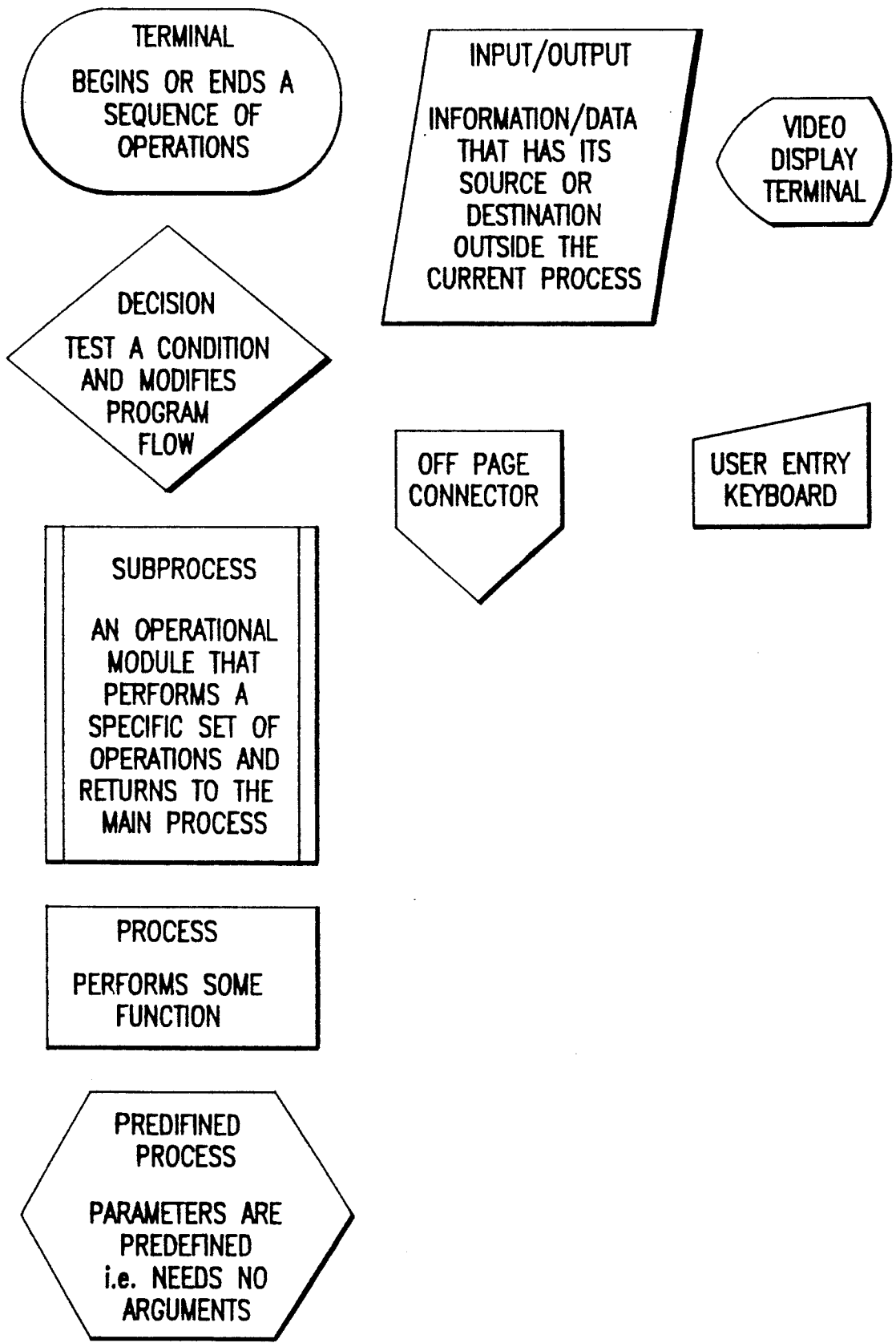
FIG. 2 is an index to the symbols used in the following process flow diagrams.
Figure 3:
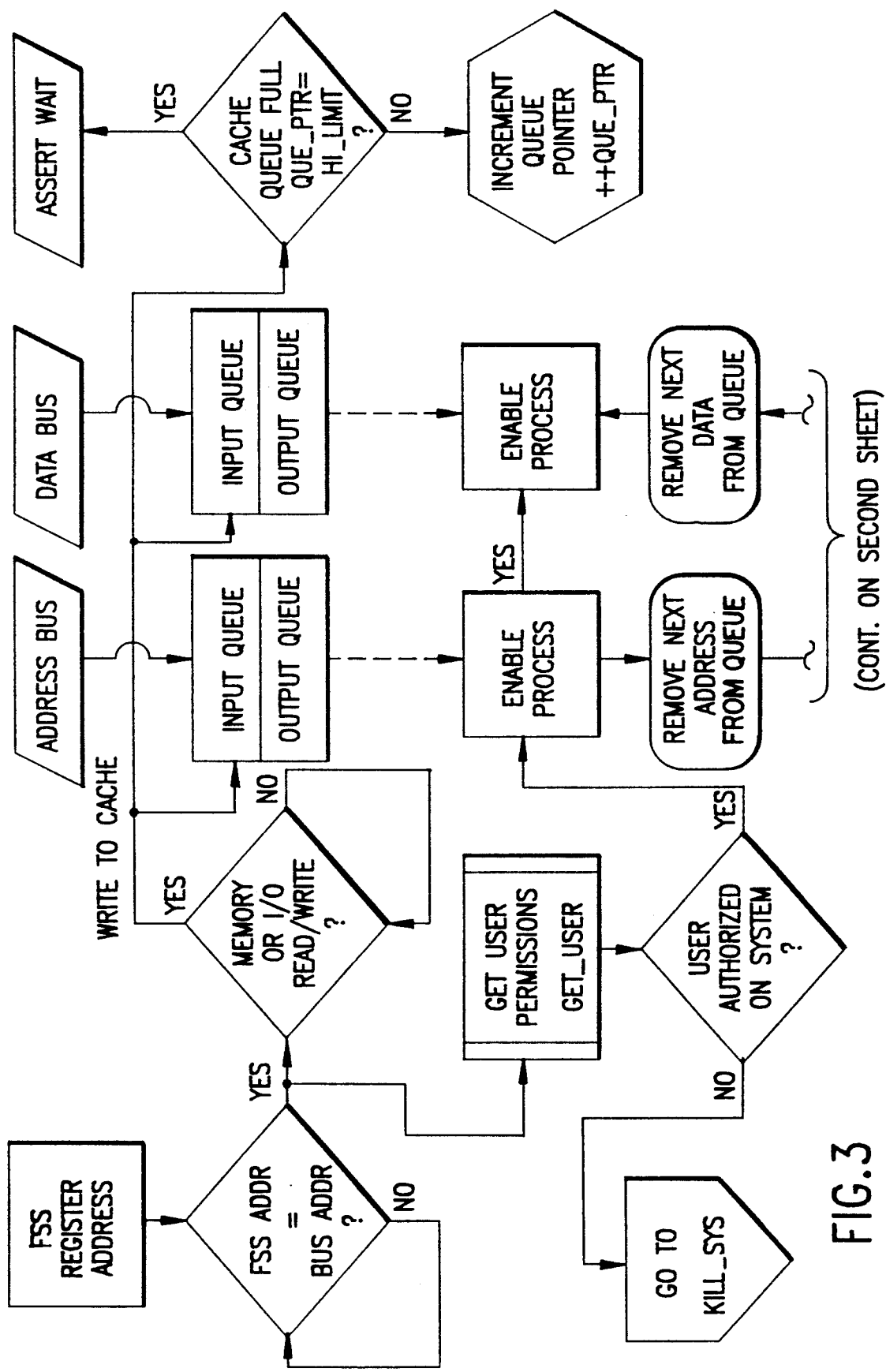
FIGS. 3-6 are process flow diagrams showing the basic logic of the file security system.
Figure 3:
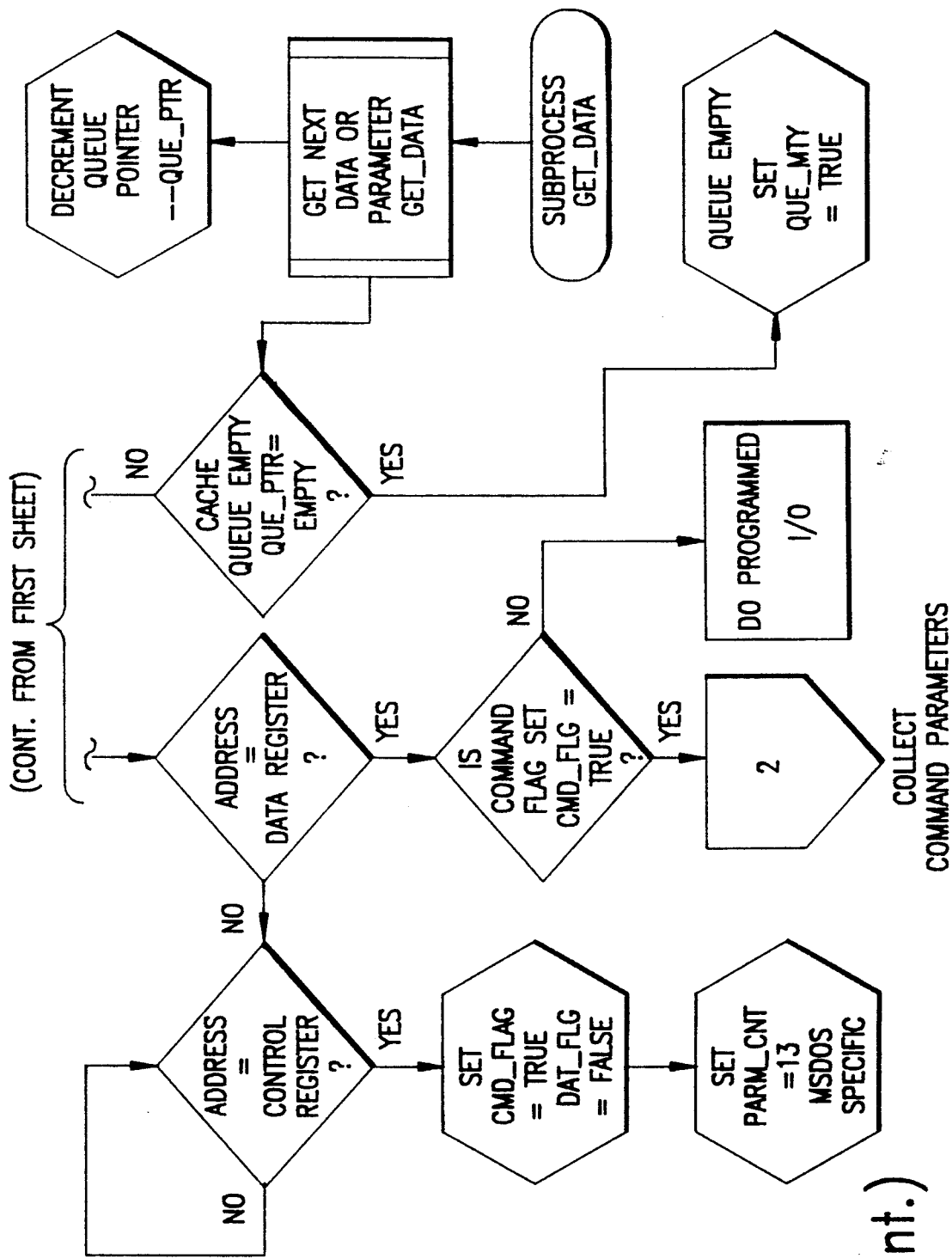
Figure 4:
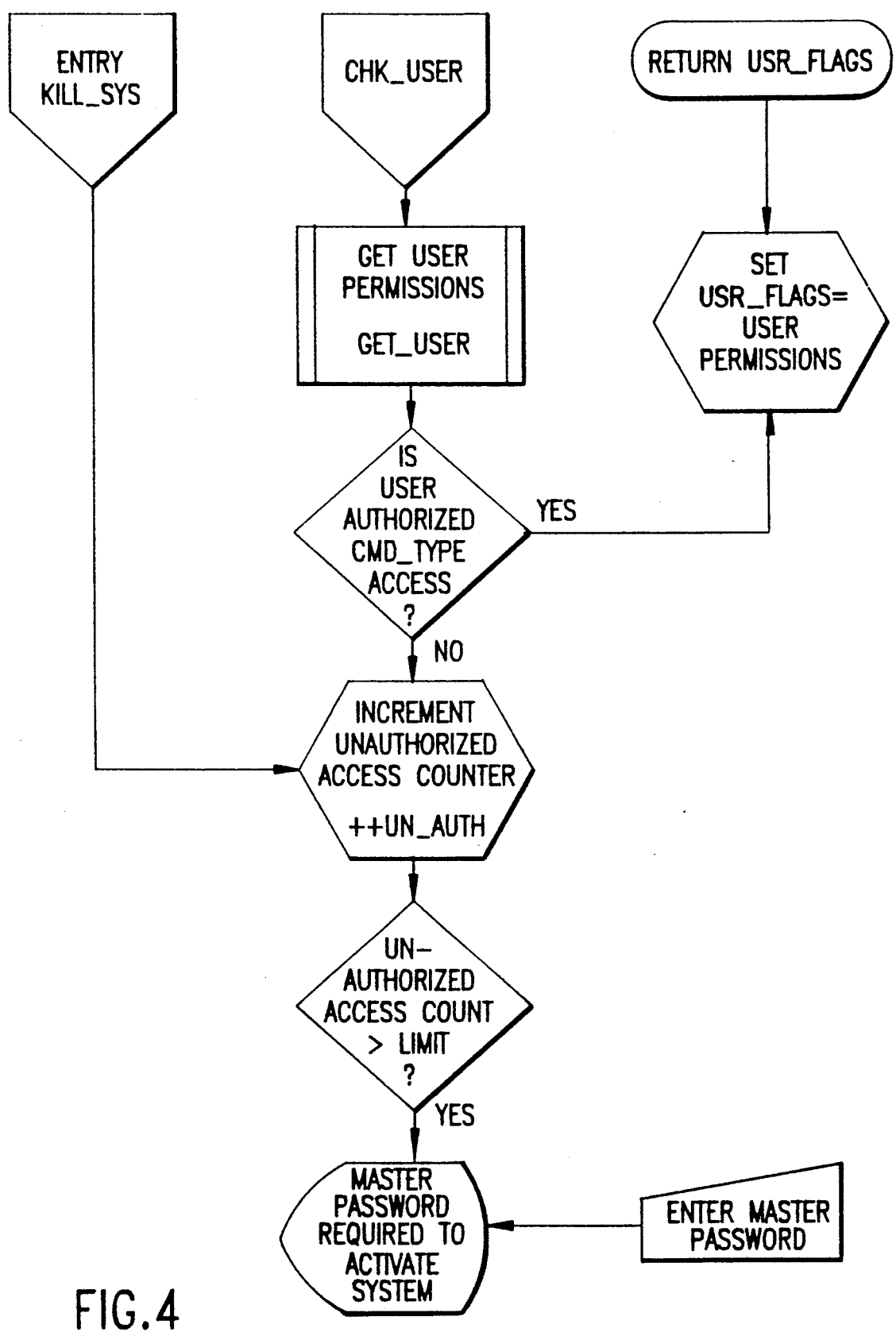
Figure 5:
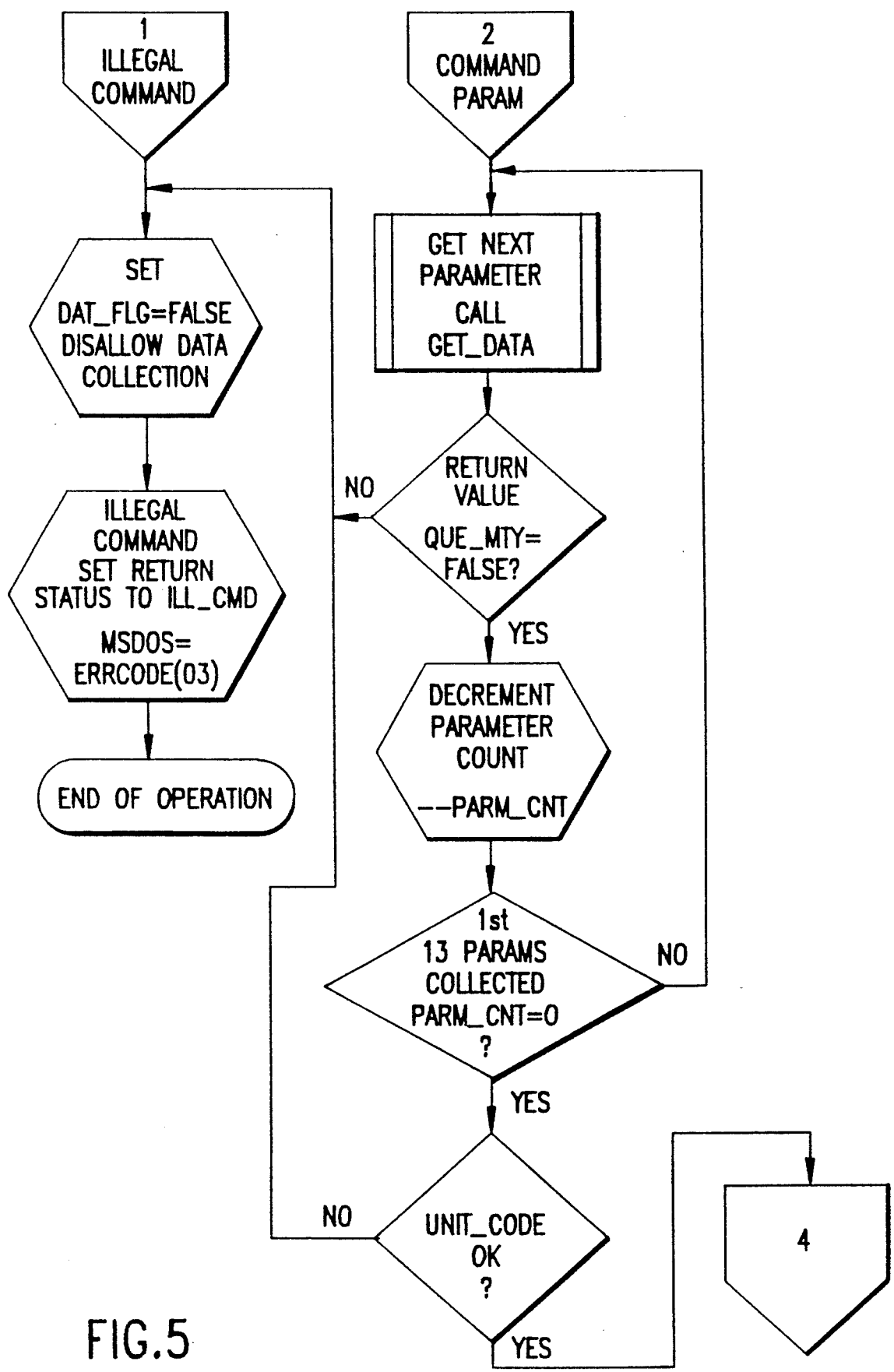

FIG. 2 is a symbol legend to the process logic diagrams shown in FIGS. 3-21. Reference to these diagrams will convey a full best present mode disclosure to one skilled in the art. A step-by-step verbal description is not only not necessary but would be redundant.

Figure 6:
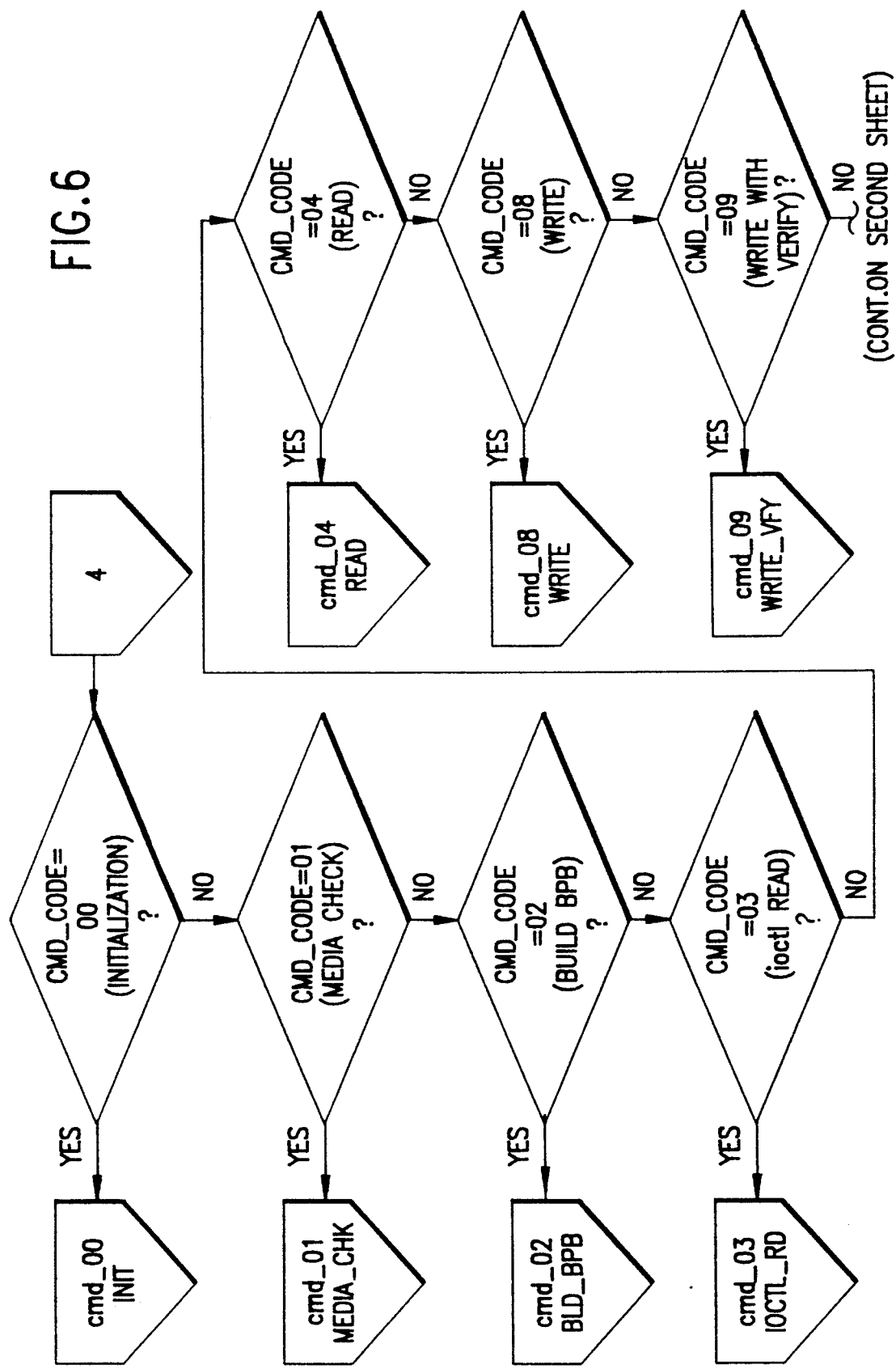
Figure 6:
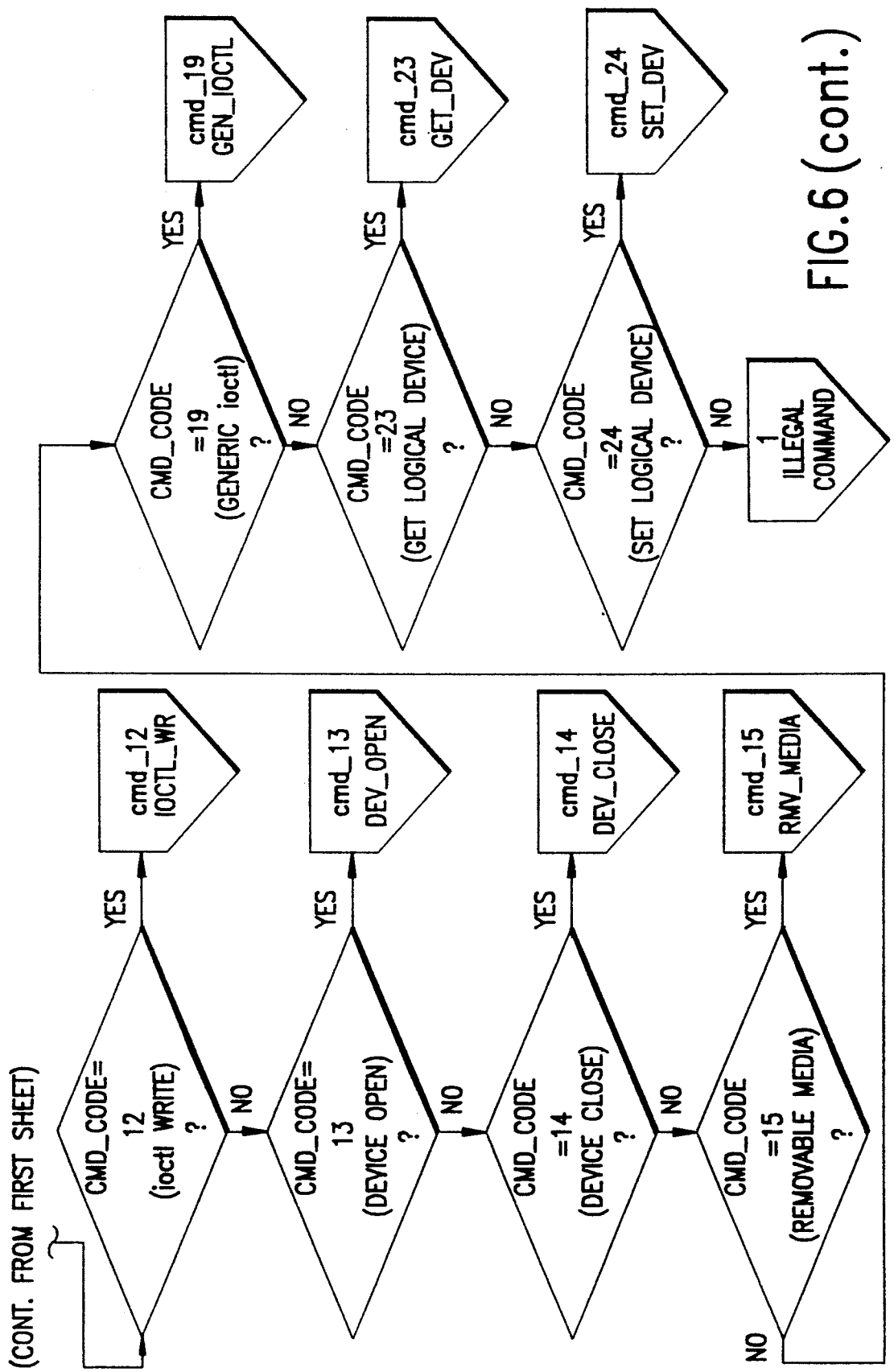
Figure 7:
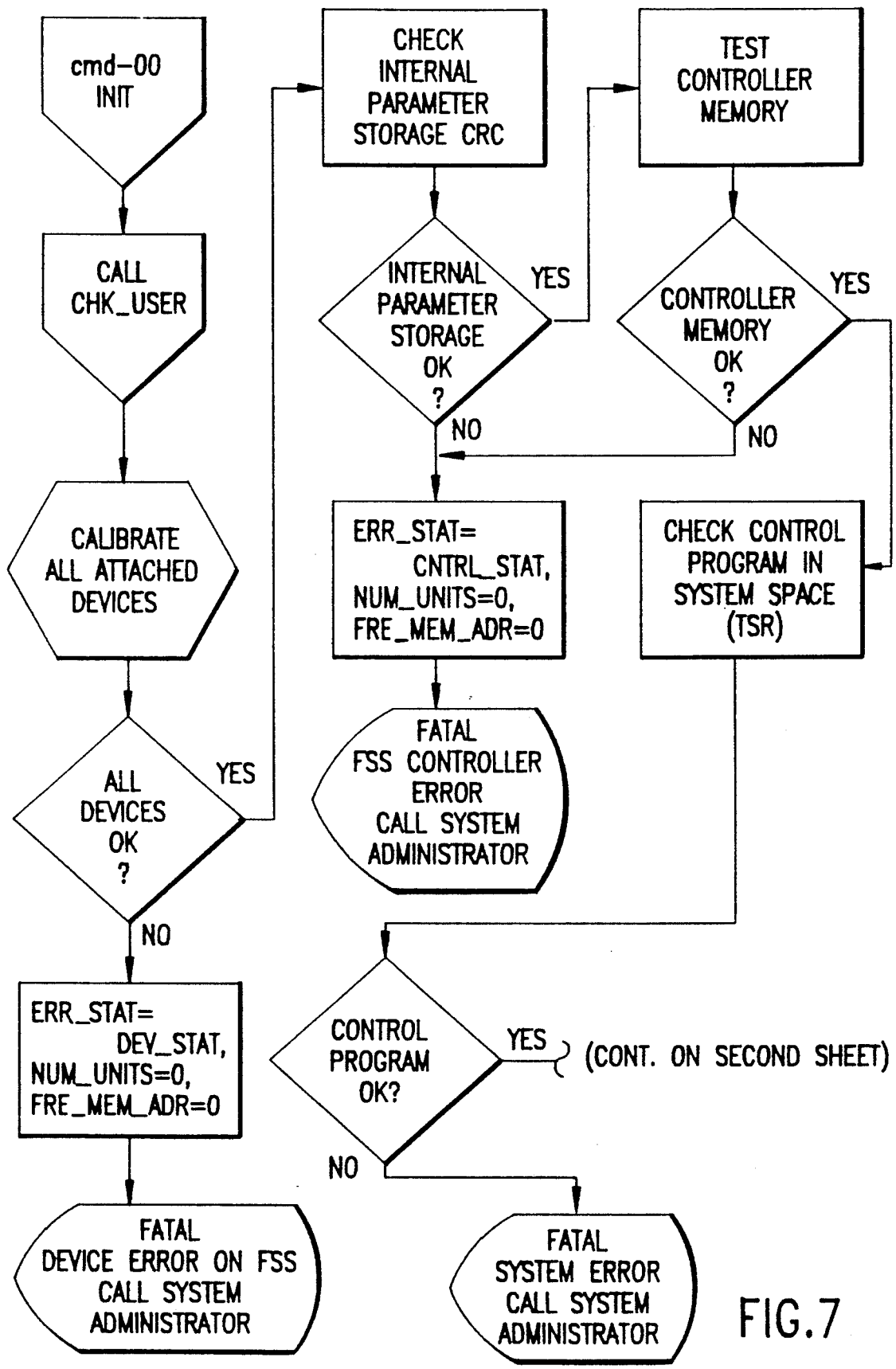
FIGS. 7-18 are subprocesses associated with the basic process logic.
Figure 7:
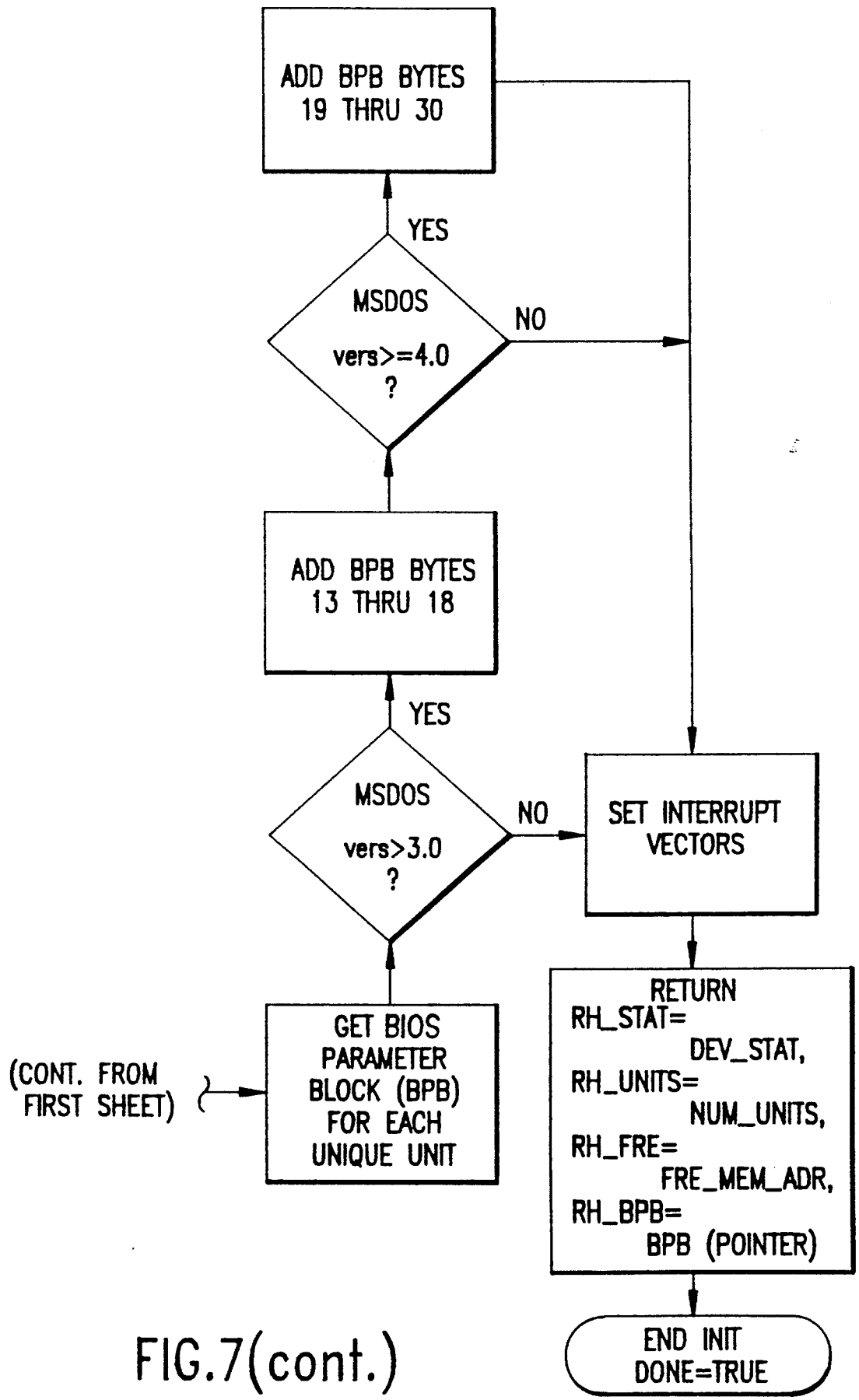
Figure 8:
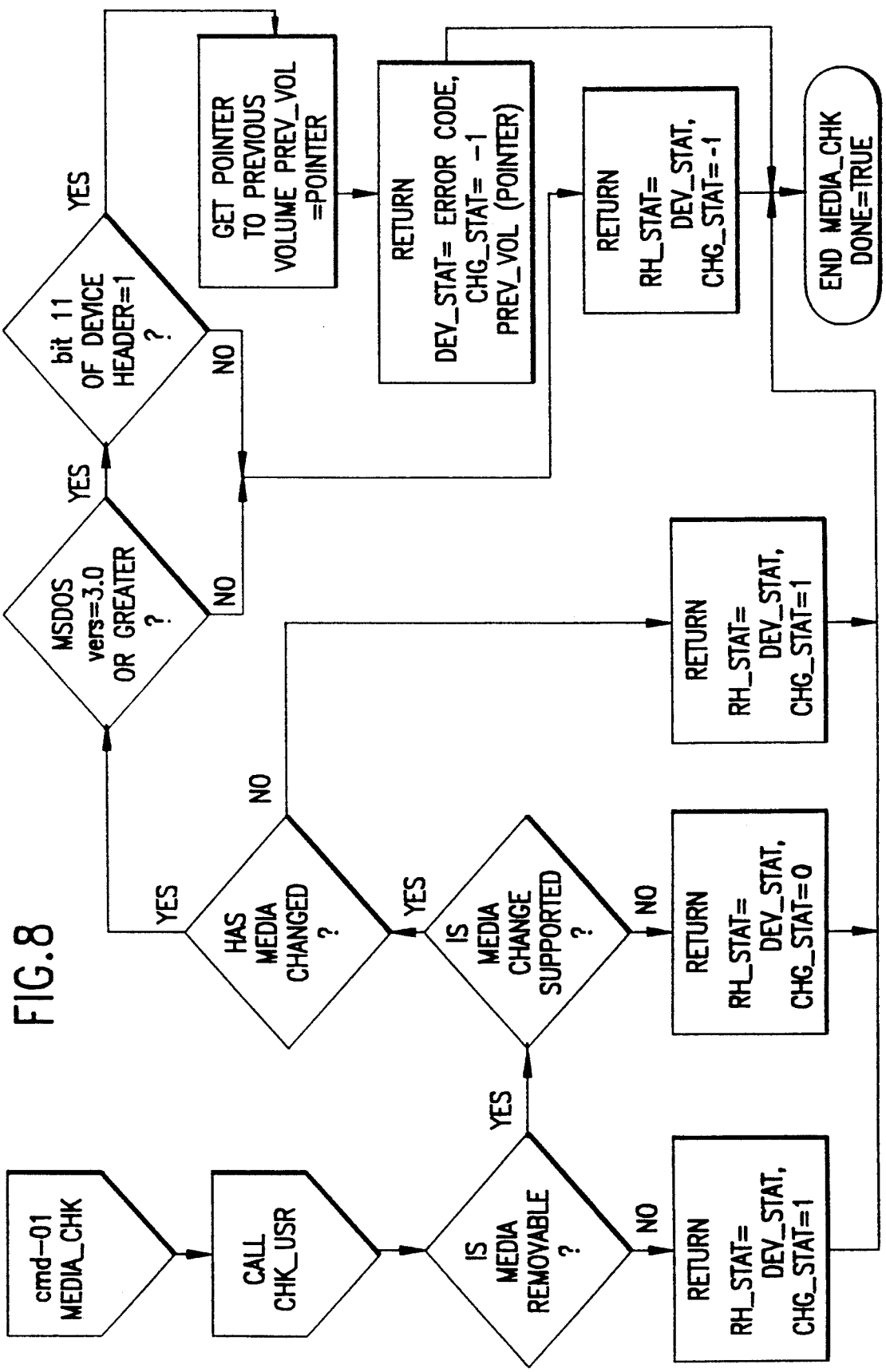
Figure 9:
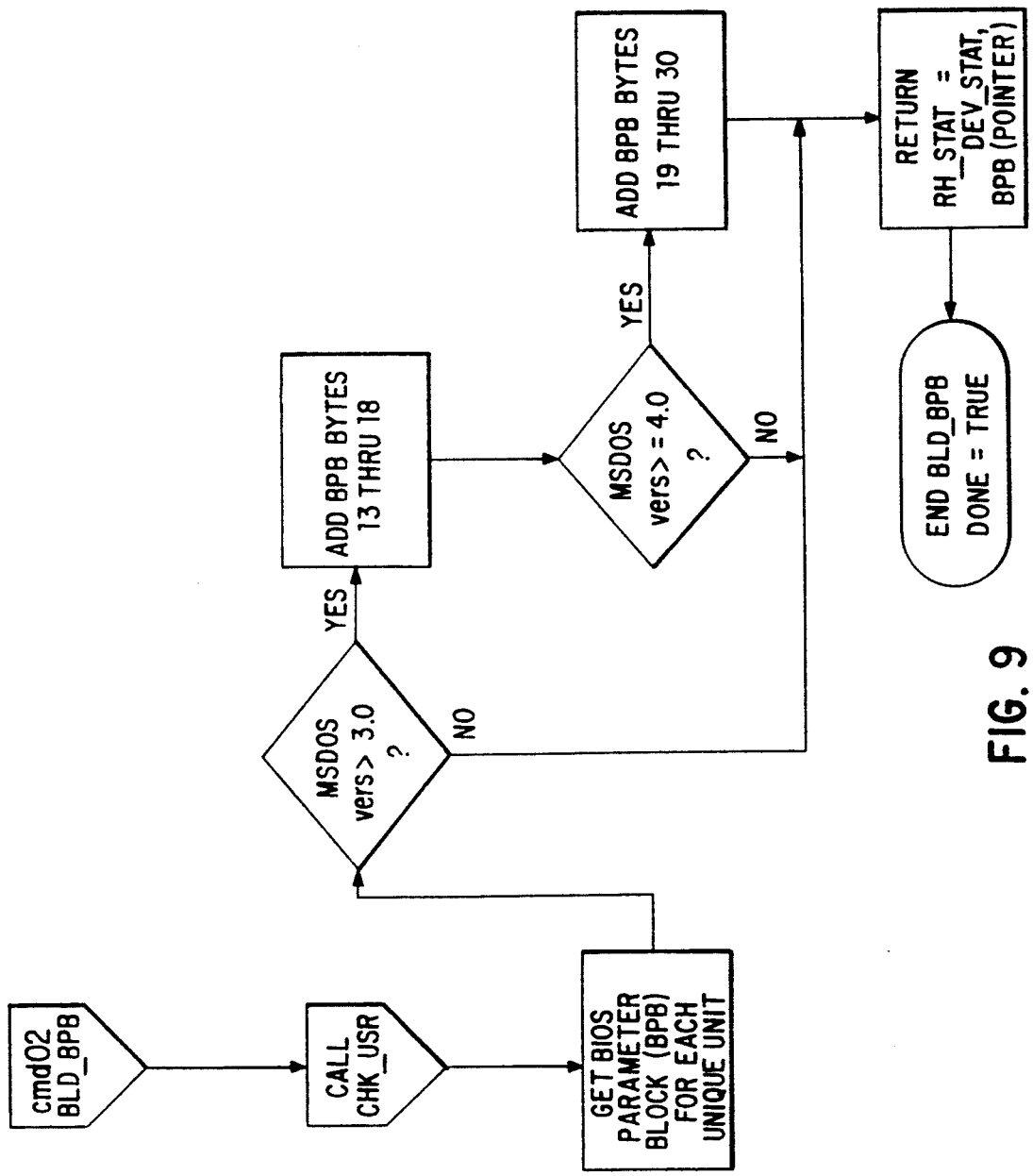
Figure 10:
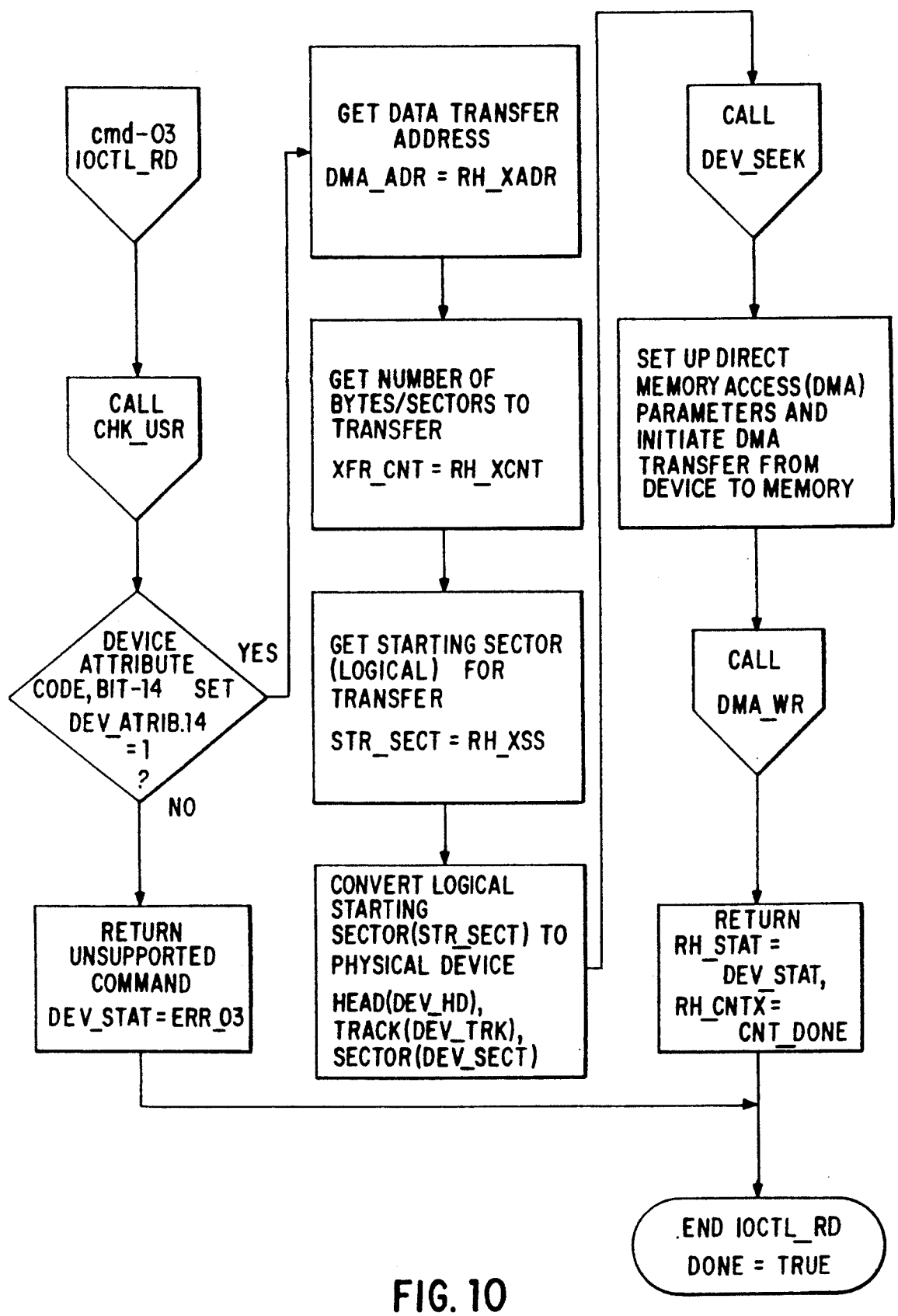
Figure 11:
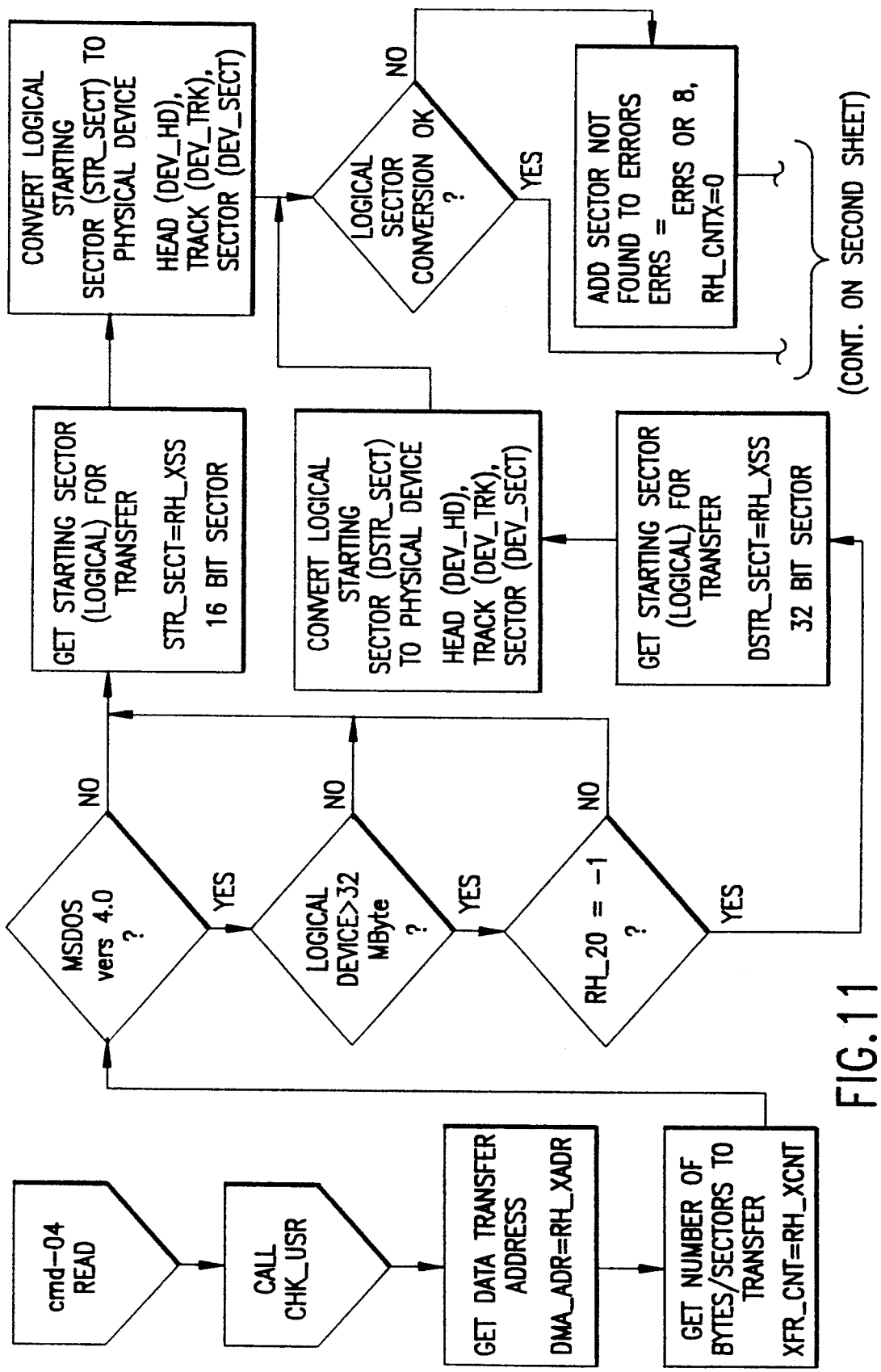
Figure 11:
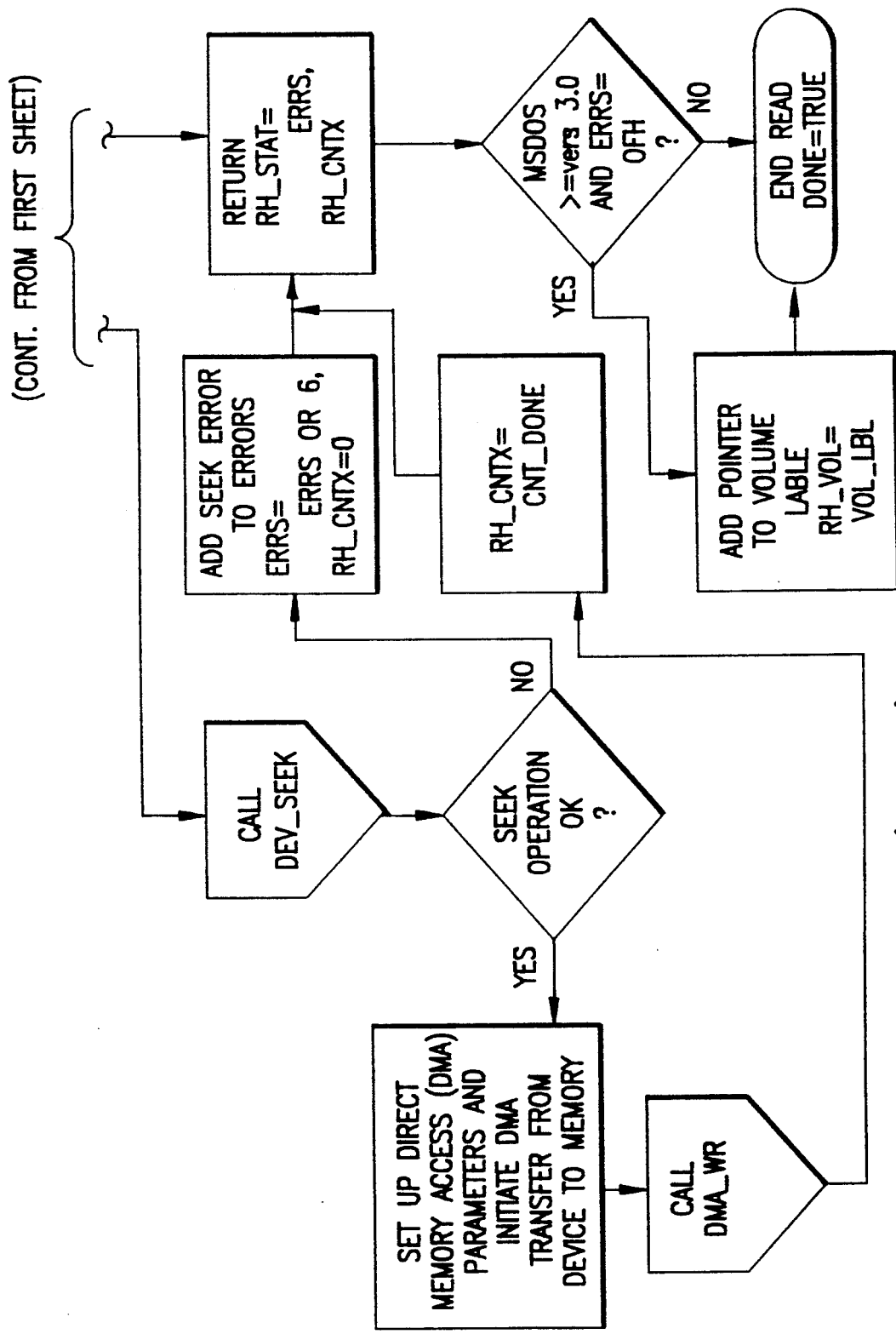
Figure 12:
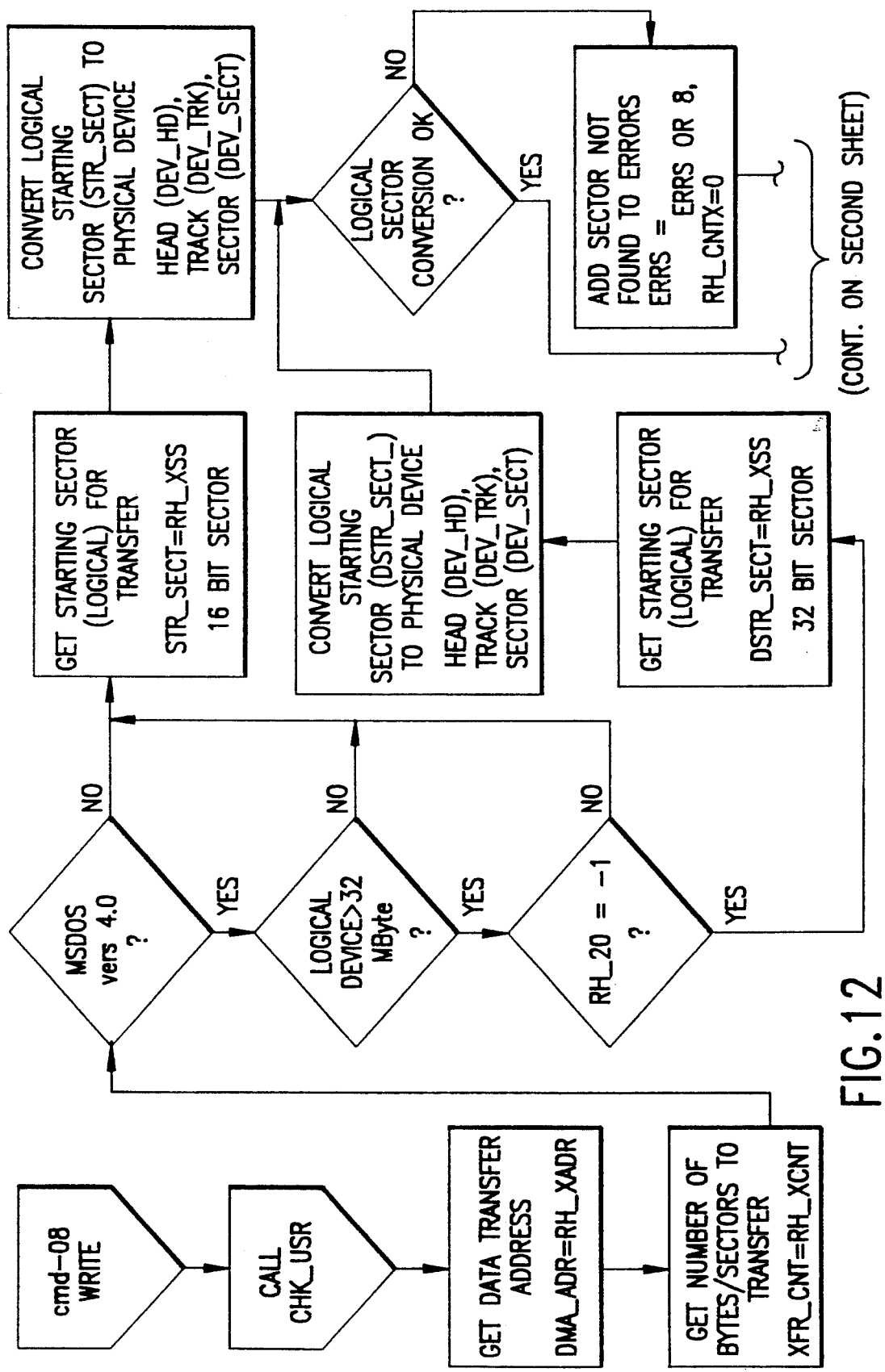
Figure 12:
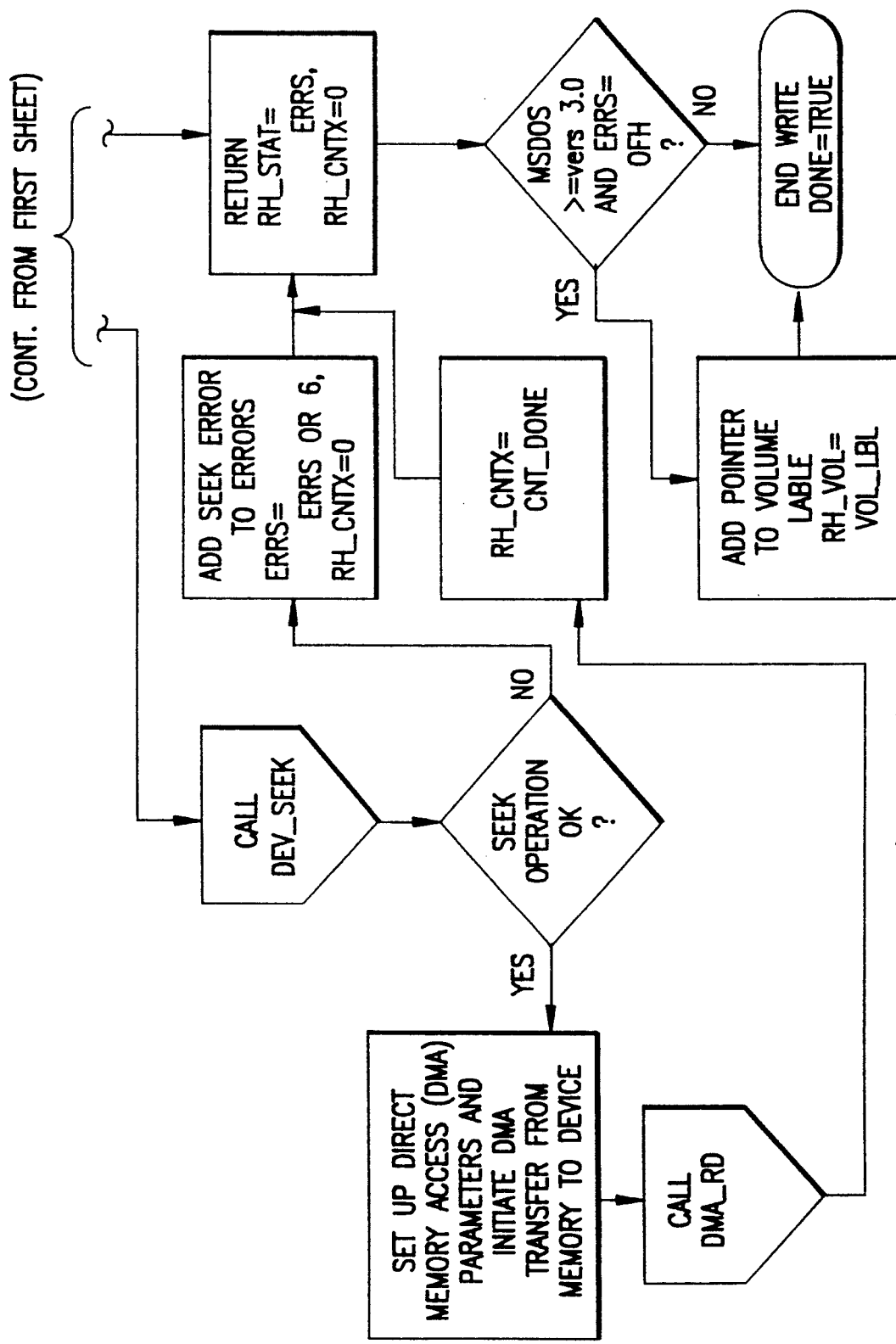
Figure 13:
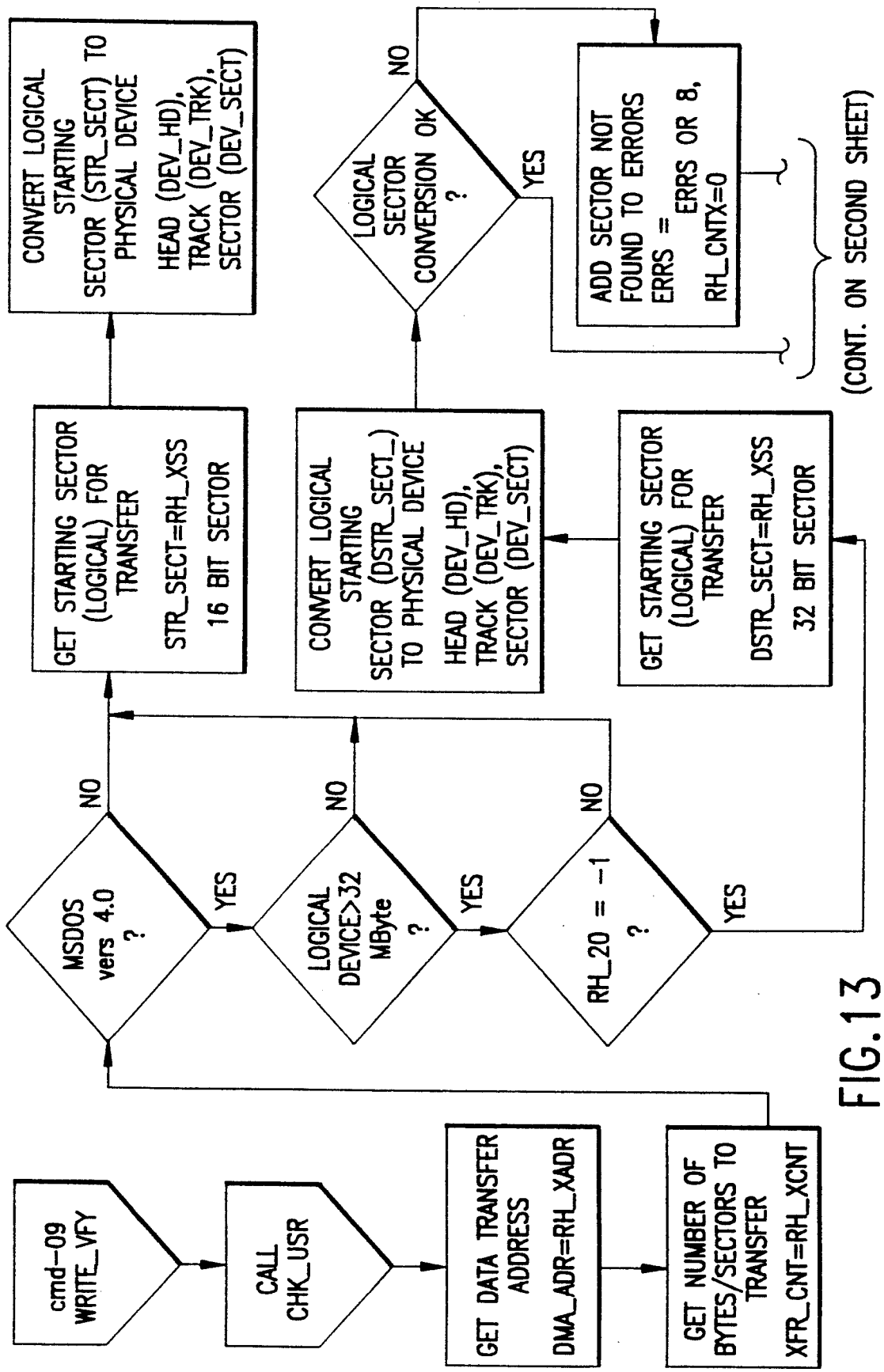
Figure 13:
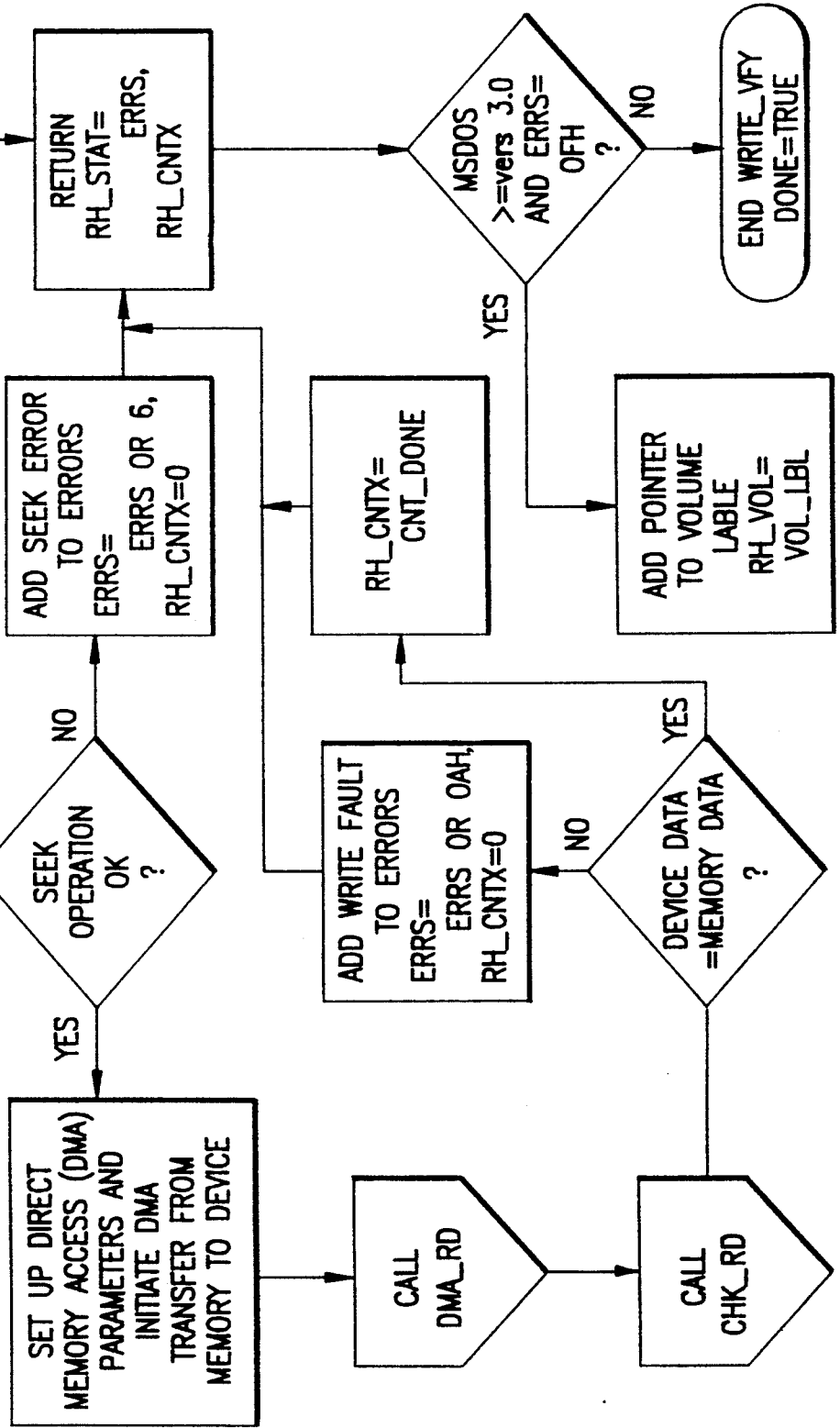
Figure 14:
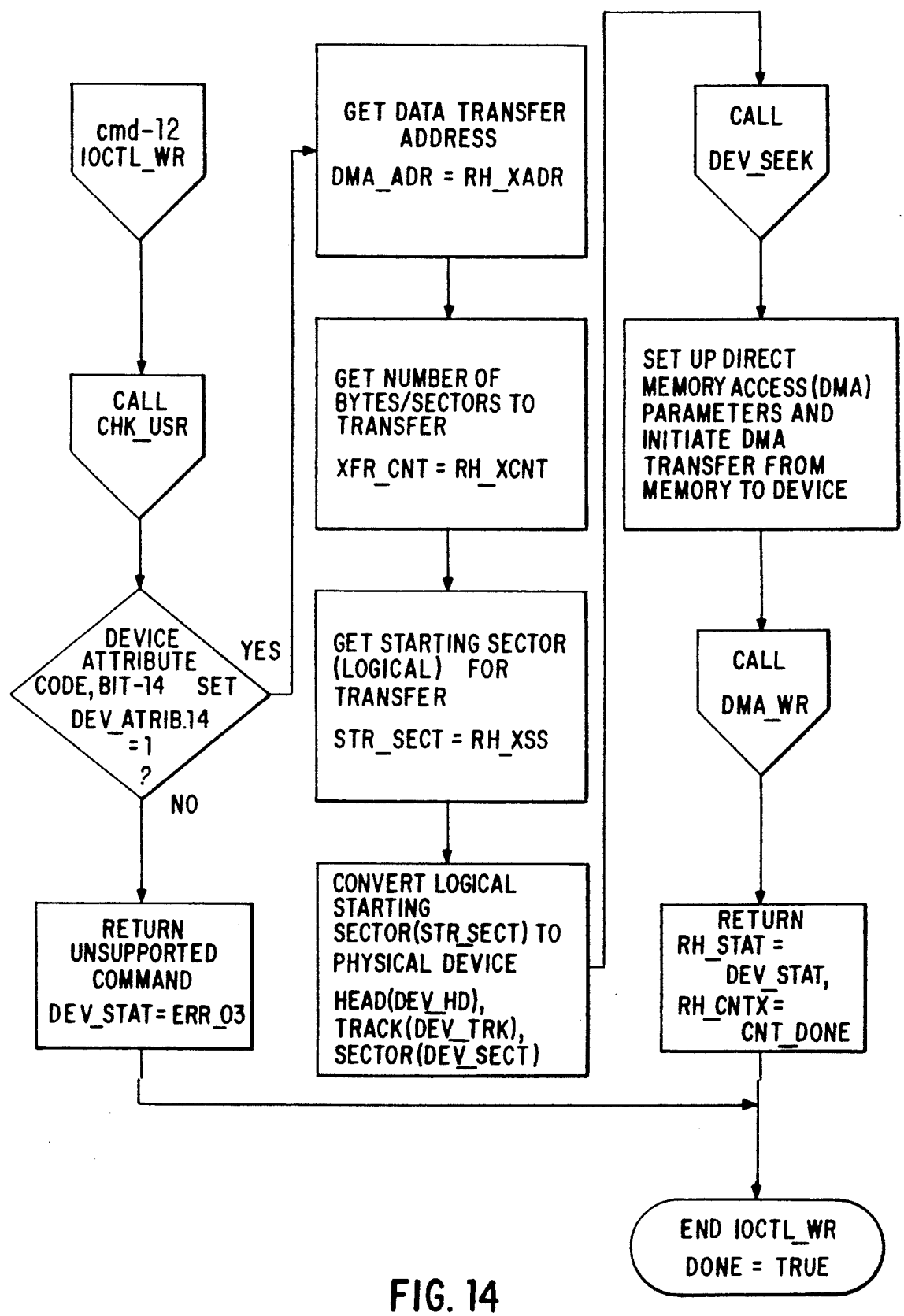
Figure 15:
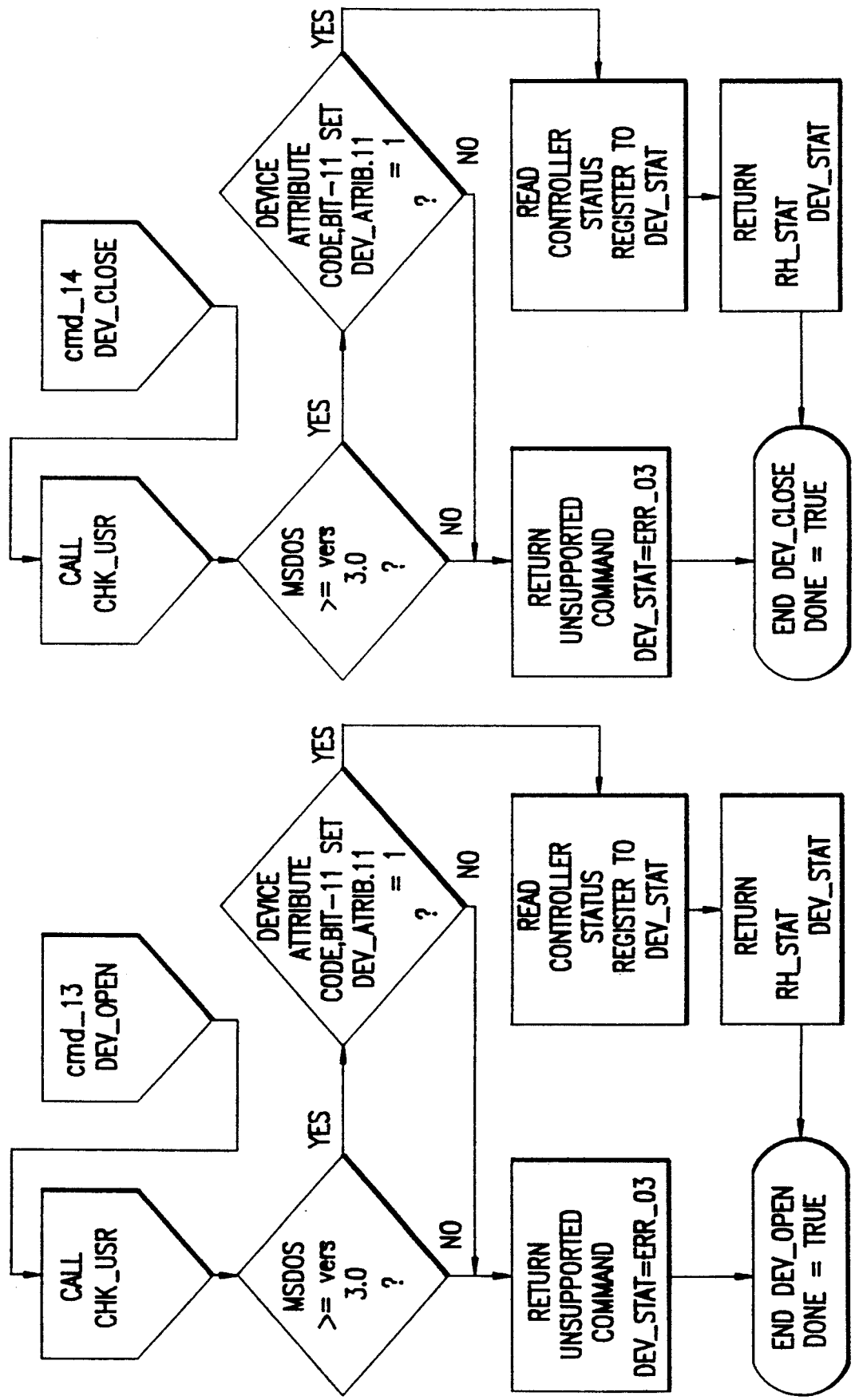
Figure 15:
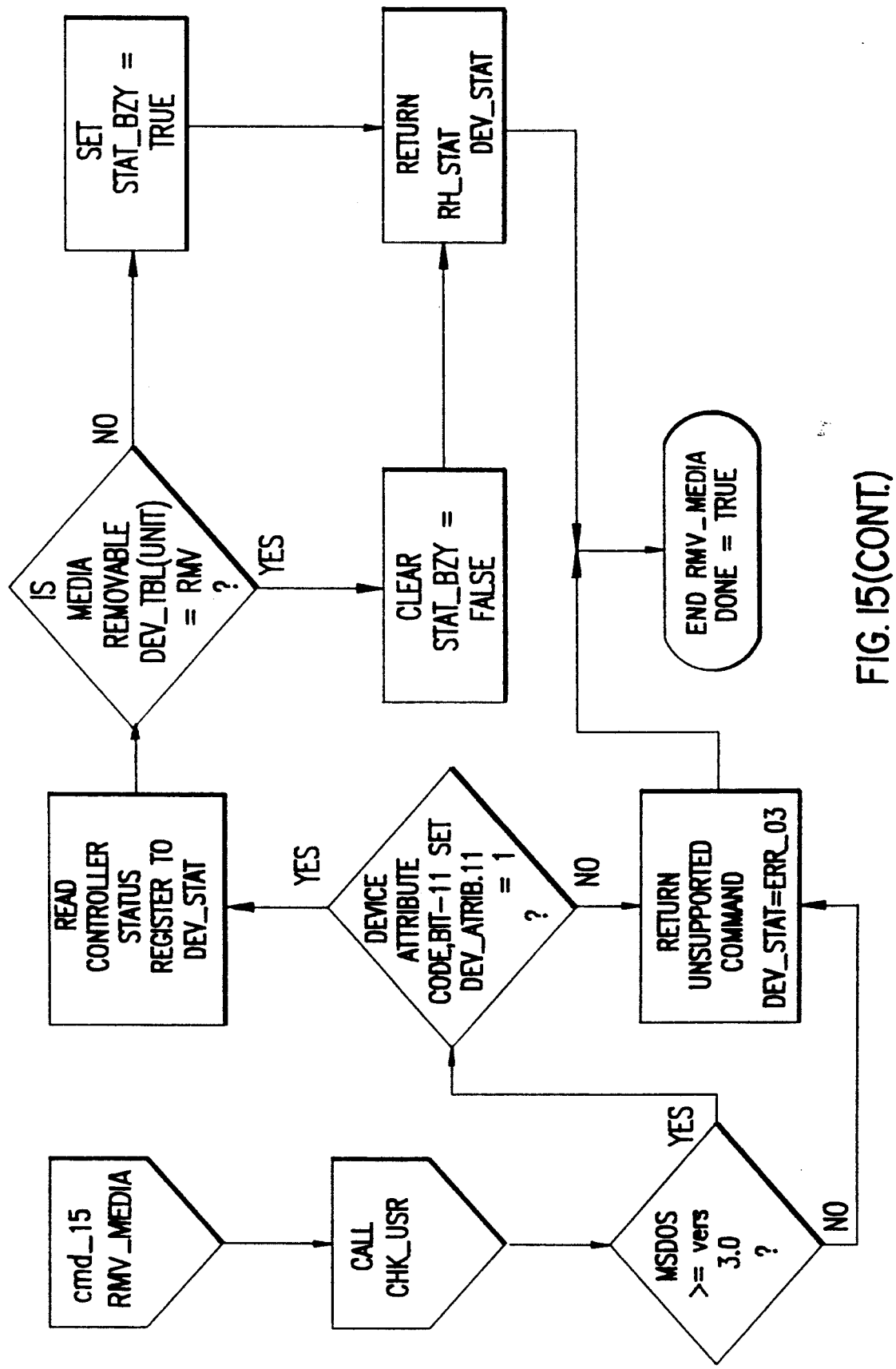
Figure 16:
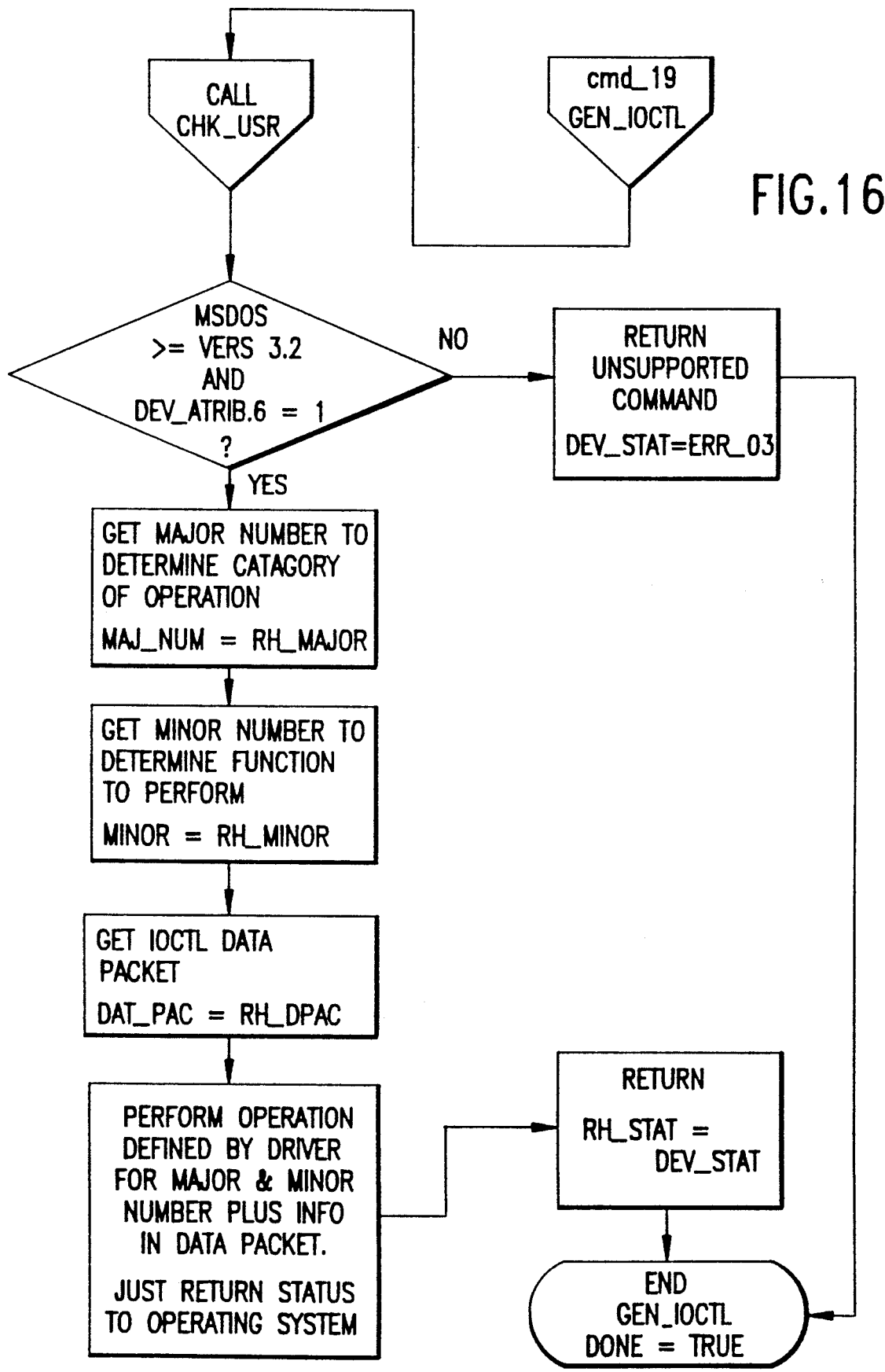
Figure 17:
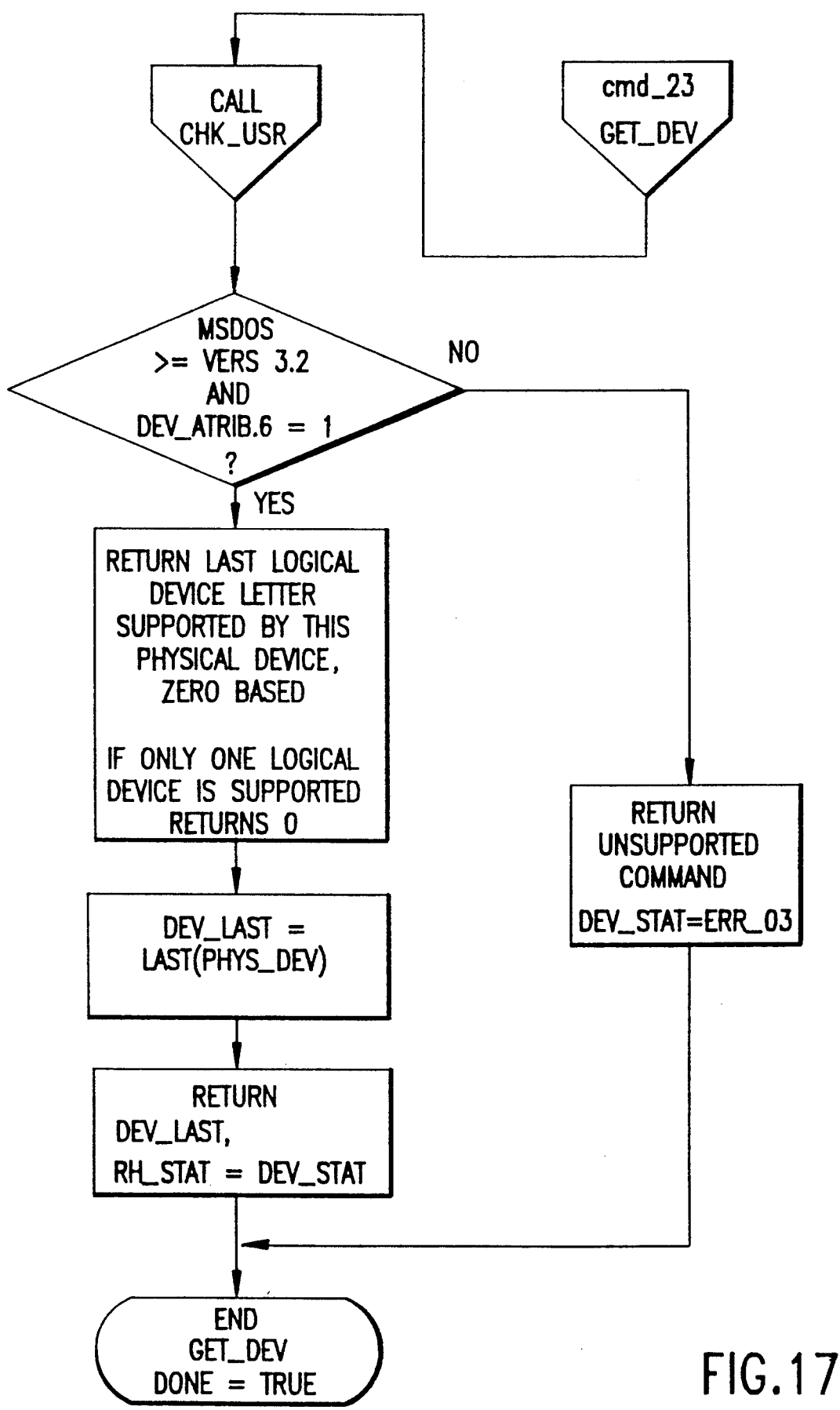
Figure 18:
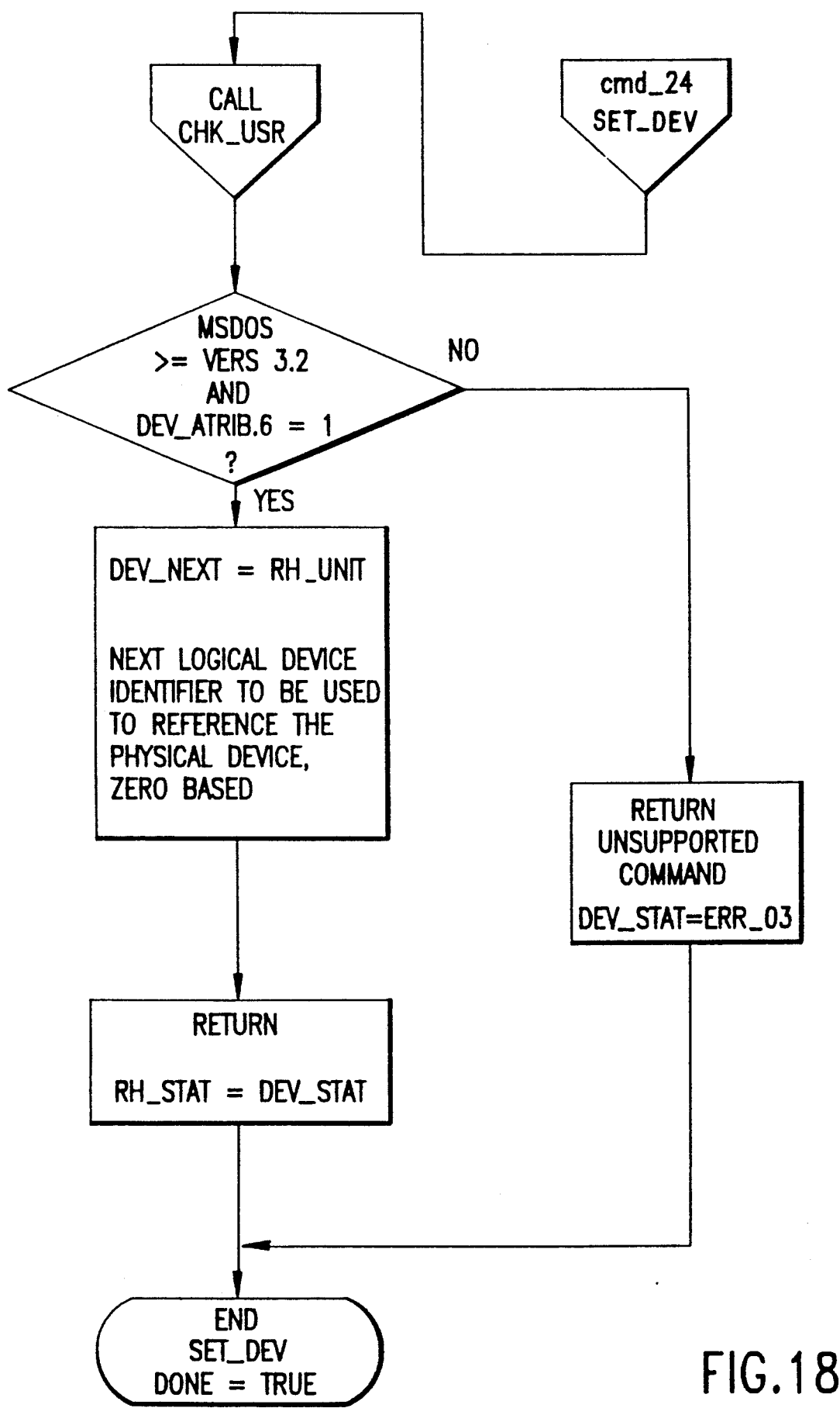
Figure 19:
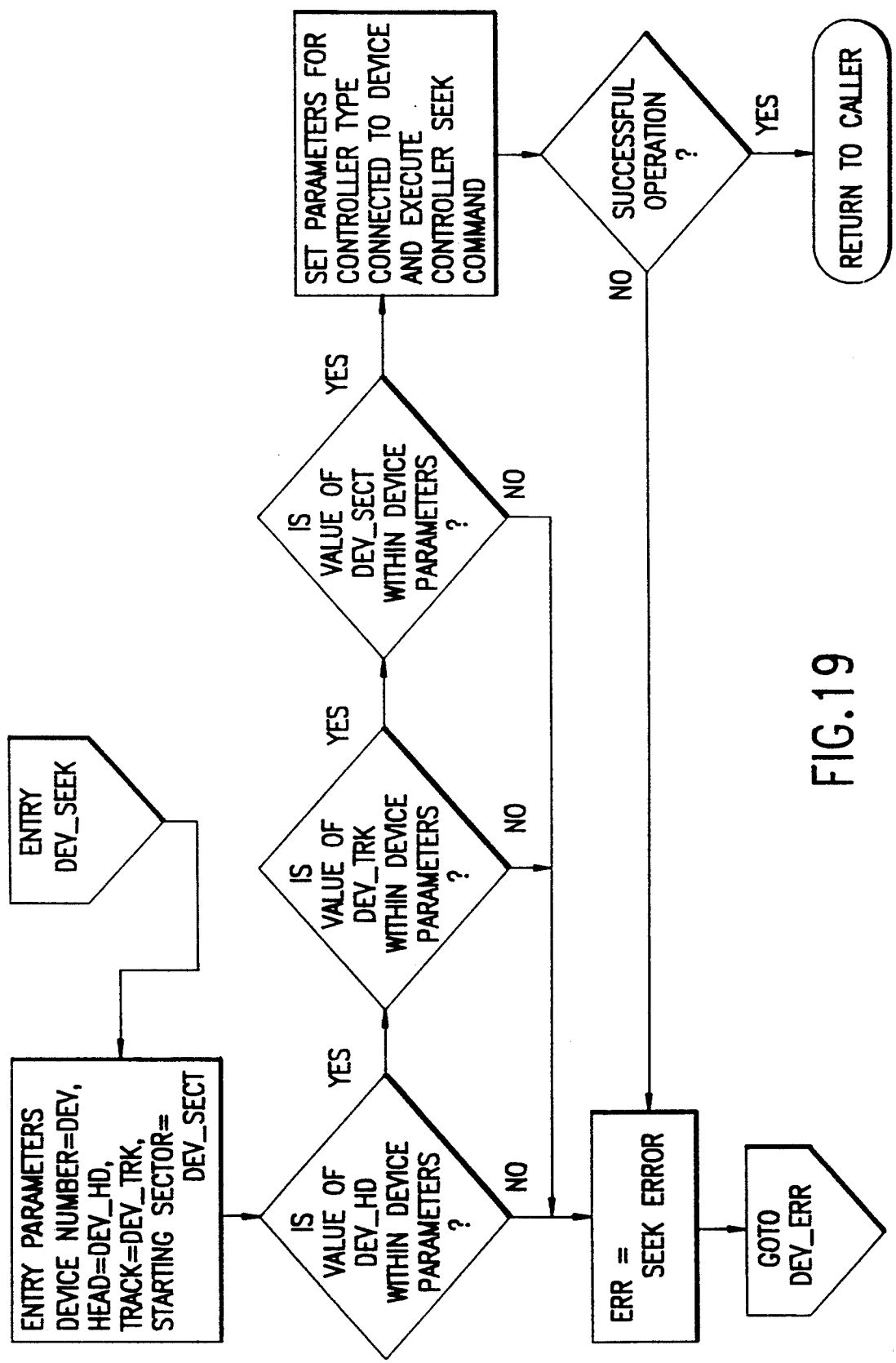
FIG. 19 shows a subprocess used within the various other subprocesses.
Figure 20:
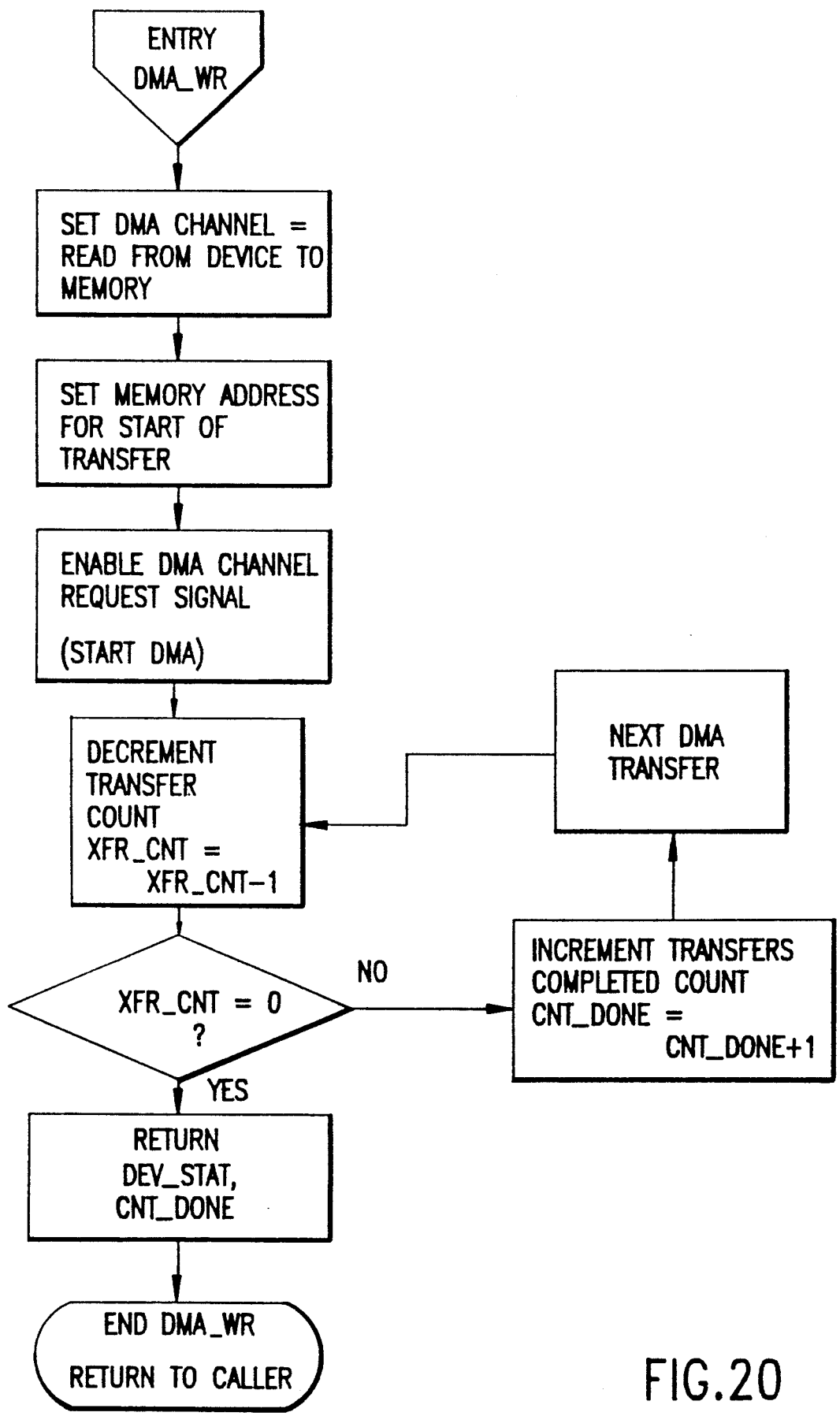
FIGS. 20 and 21 show direct memory access read and write subprocesses used within the various other subprocesses.
Figure 21:
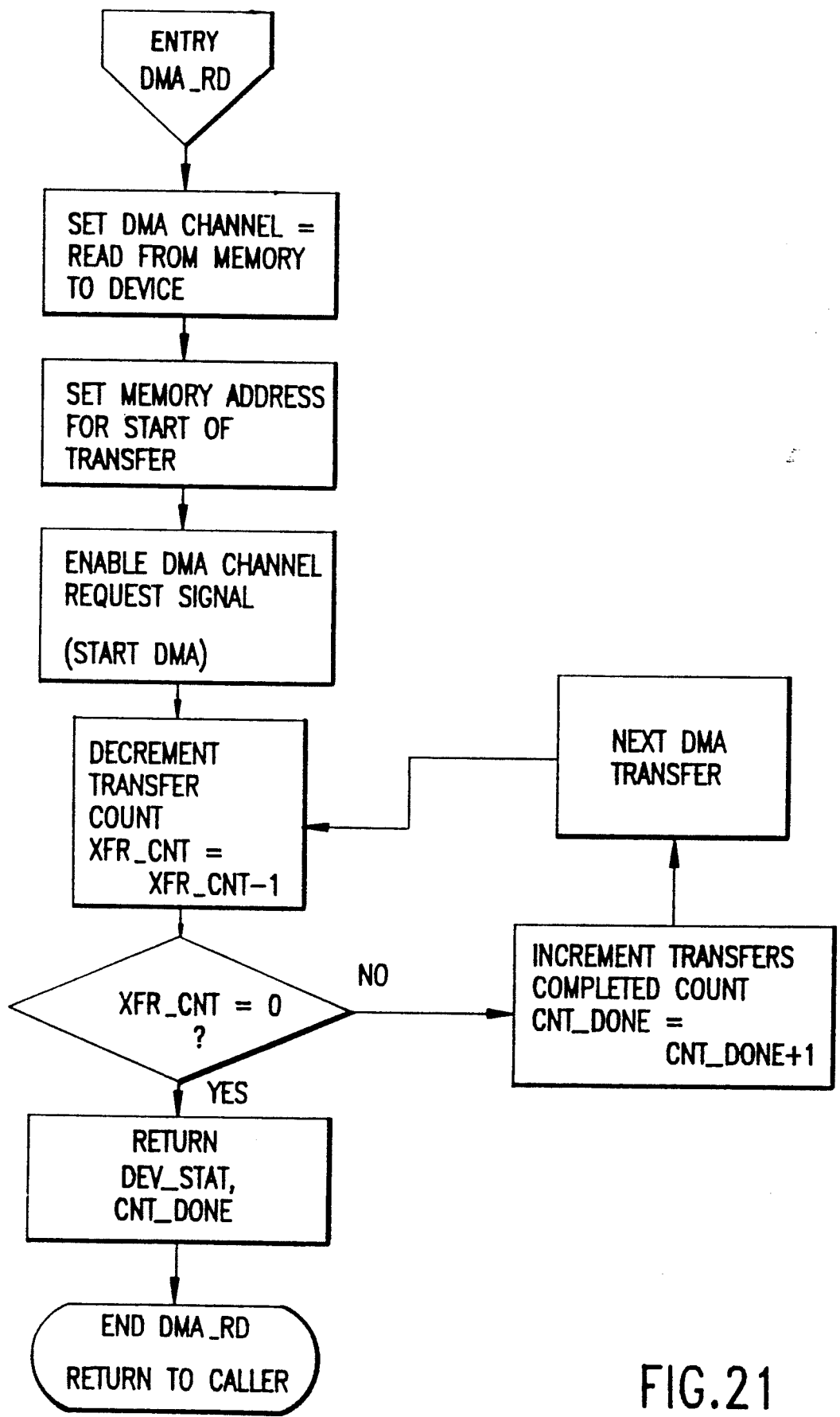

The basic outline of the process logic is shown in FIGS. 3-6. FIG. 6 ties by the various offpage connector symbols to subprocesses shown in FIGS. 7-18. FIG. 19 is a subprocess used within the various other subprocesses. FIGS. 20 and 21 show direct memory access subprocesses also used in the various other subprocesses.

Having thus disclosed the best mode known by the inventor of making and using his invention, it will be evident to those skilled in the art that many variations are possible without departing from the spirit of the invention. The invention should be considered as being limited only as it is described in the appended claims.

I claim:

1. A computer file protection system for a digital computer accessible for storing files and interconnected with a central processing, unit by a bus carrying control logic signals, address signals, and data signals, said computer further being supplied with a computer operating system, the combination comprising:

(a) means for providing a file security subsystem for said digital computer which comprises programmable auxiliary memory and a control unit;
   (b) means for attaching said programmable auxiliary memory and said control unit to the bus in a manner so that it resides in the bus between said file storage device and said central processing unit;
   (c) means for allowing access to said file security subsystem by the computer operating system for initialization and modification only during an installation stage of, the file security subsystem by said computer operating system following said installation stage;
   (d) means for providing the programmable auxiliary memory system with supervisor entered access criteria for access permission for read operations, write operations and execute operations for each one of all the files stored in said file storage device;
   (e) means for requiring each user to provide to said programmable auxiliary memory a valid user identification, whereupon said programmable auxiliary memory and control unit will indicate to the computer operating system only those of said files which are accessible to that user and whether read operations, write operations and execute operations may be performed upon said accessible files, said auxiliary memory and control unit denying access to users with invalid access criteria and refusing to write data to any of the files stored in said file storage device when operations without valid access criteria have been attempted.

2. The computer file protection system of claim 1 further including means for developing a file signature for each and everyone of the files, and archiving each such file signature.

3. The file protection system of claim 2 which further includes means for checking the file signature of each of the files stored in the file security subsystem with the archived file signatures of the files stored in the file security subsystem for correspondence prior to notifying a user that entry has been denied or an unauthorized operation has been attempted.

4. The file protection system of claim 1 wherein the means accessing said file security subsystem after installation includes means requiring entry of a proper master password.

5. The file protection system of claim 1 further including means for creating a protected area within the file storage device inaccessible to the computer operating system.

6. The file protection system of claim 5 further including (f) means for determining a file signature for each one of all pertinent files within the digital computer;
   (g) means for storing each one os aid file signatures for archival reference in the protected storage area;
   (h) means for comparing the unique file signatures stored in said protected area with the current file signature of any file prior to permitting access to the file to a user; and
   (i) means for write protecting the storage device if the current file signature does not correspond with the file signature stored in said protected area.

7. The file protection system of claim 6 which further includes means for locking the computer system from further activity when the current file signature does not correspond with the file signature stored in said protected area, said computer system remaining disable until unlocked by a person with access to a master password.

8. The file protection system of claim 5 which further includes means for creating a transaction log in the protected storage area, said transaction log being accessible only to a person having a master password.

9. The file protection system of claim 5 in which said supervisor entered criteria are specific for each user or user group.

10. The file protection system of claim 1 which further includes means for taking possession of the central processing unit by the file security subsystem and disabling all other access to said central processing unit at such time as the file security subsystem detects invalid access criteria or an attempted unauthorized operation.

* * * * *